(12) United States Patent
Kagaya et al.

(10) Patent No.: US 8,085,938 B2
(45) Date of Patent: Dec. 27, 2011

(54) SECRET INFORMATION MANAGEMENT SCHEME BASED ON SECRET SHARING SCHEME

(75) Inventors: Makoto Kagaya, Urayasu (JP);
Toshihiko Ogihara, Funabashi (JP);
Susumu Nomura, Matsudo (JP)

(73) Assignee: NTT Communications Corporation, Tokyo (JP)

( * ) Notice: Subject to any disclaimer, the term of this patent is extended or adjusted under 35 U.S.C. 154(b) by 1517 days.

(21) Appl. No.: 10/588,155

(22) PCT Filed: Feb. 10, 2005

(86) PCT No.: PCT/JP2005/002514
§ 371 (c)(1),
(2), (4) Date: Aug. 1, 2006

(87) PCT Pub. No.: WO2005/076518
PCT Pub. Date: Aug. 18, 2005

(65) Prior Publication Data
US 2007/0160197 A1    Jul. 12, 2007

(30) Foreign Application Priority Data

Feb. 10, 2004  (JP) ................................ 2004-033352
Feb. 10, 2004  (JP) ................................ 2004-033355
Jun. 7, 2004   (JP) ................................ 2004-169001

(51) Int. Cl.
*H04L 9/24*     (2006.01)
*H04L 9/20*     (2006.01)
*H04L 9/08*     (2006.01)
*H04L 9/00*     (2006.01)

(52) U.S. Cl. ............ 380/286; 380/28; 380/277; 380/47; 380/46; 713/171; 713/168; 726/2; 726/3; 726/5; 709/217; 709/218; 709/219; 705/71; 705/64

(58) Field of Classification Search .................. None
See application file for complete search history.

(56) References Cited

U.S. PATENT DOCUMENTS 5,623,548 A * 4/1997 Akiyama et al. ................ 380/28
(Continued)

FOREIGN PATENT DOCUMENTS

EP       0 723 348 A2    7/1996
(Continued)

OTHER PUBLICATIONS

Japanese Office Actions issued on Sep. 7, 2010 and Oct. 5, 2010 in the corresponding Japanese Patent Applications No. 2004-169001 and 2004-033355.

(Continued)

*Primary Examiner* — Syed A. Zia
(74) *Attorney, Agent, or Firm* — NDQ&M Watchstone LLP

(57) ABSTRACT

In a secret information management system for managing a secret information of a user, the secret information is divided into a plurality of divided data by using a secret sharing scheme, such that the secret information can be recovered from a prescribed number of the divided data, and a part of the plurality of divided data is stored into a terminal of the user as user's divided data while a rest of the plurality of divided data are stored into one or more of deposit servers. Then, a plurality of re-divided data different from the plurality of divided data are generated, from a combination of the prescribed number of the divided data among the divided data stored in the deposit servers by using the secret sharing scheme, and a part of the plurality of re-divided data is stored into the terminal as newly generated user's divided data while a rest of the plurality of re-divided data are stored into the deposit servers as newly generated divided data.

15 Claims, 24 Drawing Sheets

U.S. PATENT DOCUMENTS

| | | | |
|---|---|---|---|
| 5,675,649 A | 10/1997 | Brennan et al. | |
| 5,867,578 A | 2/1999 | Brickell et al. | |
| 6,209,091 B1 | 3/2001 | Sudia et al. | |
| 6,411,716 B1 | 6/2002 | Brickell | |
| 6,810,122 B1* | 10/2004 | Miyazaki et al. | 380/30 |
| 6,996,724 B2* | 2/2006 | Murakami et al. | 713/193 |
| 7,352,867 B2* | 4/2008 | Medvinsky | 380/278 |
| 7,565,697 B2* | 7/2009 | LeVine et al. | 726/26 |
| 7,886,162 B2* | 2/2011 | Murase et al. | 713/193 |
| 2001/0012362 A1* | 8/2001 | Marzahn | 380/42 |
| 2002/0097868 A1* | 7/2002 | Watanabe et al. | 380/46 |
| 2003/0147535 A1* | 8/2003 | Nadooshan et al. | 380/277 |
| 2011/0072121 A1* | 3/2011 | Takasugi et al. | 709/222 |
| 2011/0126291 A1* | 5/2011 | Araki | 726/26 |

FOREIGN PATENT DOCUMENTS

| | | |
|---|---|---|
| JP | 07-036932 A | 2/1995 |
| JP | 9212089 | 8/1997 |
| JP | 10-320478 A | 12/1998 |
| JP | 11506222 | 6/1999 |
| JP | 11317734 | 11/1999 |
| JP | 2000-151574 A | 5/2000 |
| JP | 200134164 | 2/2001 |
| JP | 2001103045 | 4/2001 |
| JP | 2002-077139 A | 3/2002 |
| JP | 2002-091302 A | 3/2002 |
| JP | 2002091301 | 3/2002 |
| JP | 2002-163235 A | 6/2002 |
| JP | 2002-271312 A | 9/2002 |
| JP | 2002312317 | 10/2002 |
| JP | 2003-044388 A | 2/2003 |
| JP | 2003132229 | 5/2003 |
| JP | 2004-023138 A | 1/2004 |
| JP | 2004048479 | 2/2004 |
| JP | 2004053968 | 2/2004 |
| JP | 2004053969 | 2/2004 |
| JP | 2004213650 | 7/2004 |
| JP | 2004336702 | 11/2004 |
| JP | 2005-236403 A | 9/2005 |
| JP | 2005-346005 A | 12/2005 |
| JP | 2005-346659 A | 12/2005 |
| JP | 2006513641 | 4/2006 |
| WO | 9639765 | 12/1996 |
| WO | 2004057461 | 7/2004 |
| WO | 2004064312 | 7/2004 |
| WO | 2005076518 | 8/2005 |

OTHER PUBLICATIONS

Corresponding Japanese Application, dated Feb. 23, 2010.
Corresponding Japanese Application, dated Mar. 2, 2010.
Keiichi Hirota, et al; "Reconstruction Control of Partial Information in Ramp Scheme"; NTT Cyber Solutions Laboratories; abstract in English page 57.
Office Action issued on Sep. 7, 2010 in the corresponding to the Japanese Patent Application No. 2004-169001.
Office Action issued on Oct. 5, 2010 in the corresponding to the Japanese Patent Application No. 2004-033355.

* cited by examiner

FIG. 8

DIVISION INTO THREE (n=3)
ORIGINAL DATA CAN BE RECOVERED FROM ANY TWO DIVIDED DATA
(m IS ARBITRARY INTEGER m>0) →CONTINUED TO TAIL OF ORIGINAL DATA S

| VALUE OF j | 1 | 2 | ... | j=2×m+1 | j+1 | ... |
|---|---|---|---|---|---|---|
| ORIGINAL DATA S(j) | S(1) | S(2) | ... | S(j) | S(j+1) | ... |
| RANDOM NUMBER R(j) | R(1) | R(2) | ... | R(j) | R(j+1) | ... |
| DIVIDED PARTIAL DATA D(1,j) | S(1)*R(1)*R(2) | S(2)*R(1)*R(2) | ... | S(j)*R(j)*R(j+1) | S(j+1)*R(j)*R(j+1) | ... |
| DIVIDED PARTIAL DATA D(2,j) | S(1)*R(1) | S(2) *R(2) | ... | S(j)*R(j) | S(j+1) *R(j+1) | ... |
| DIVIDED PARTIAL DATA D(3,j) | R(1) | R(2) | ... | R(j) | R(j+1) | ... |

FIG. 21

ORIGINAL

| VALUE OF j | 1 | 2 | 3 | ... |
|---|---|---|---|---|
| ORIGINAL DATA S(j) | S(1) | S(2) | S(3) | ... |
| RANDOM NUMBER R(j) | R(1) | R(2) | R(3) | ... |
| DIVIDED PARTIAL DATA D(1,j) | S(1)*R(1)*R(2)*R(3) | S(2)*R(1)*R(2)*R(3) | S(3)*R(1)*R(2)*R(3) | ... |
| DIVIDED PARTIAL DATA D(2,j) | S(1)*R(1)*R(2) | S(2) | *R(2)*R(3) | S(3)*R(1) | *R(3) | ... |
| DIVIDED PARTIAL DATA D(3,j) | S(1)*R(1) | S(2) | *R(2) | S(3)*R(1) | *R(3) | ... |
| DIVIDED PARTIAL DATA D(4,j) | R(1) | R(2) | R(3) | ... |

ROTATE (1, D(1, 2), D(2, 2), D(3, 2))
ROTATE (2, D(1, 3), D(2, 3), D(3, 3))

IMPROVEMENT

| VALUE OF j | 1 | 2 | 3 | ... |
|---|---|---|---|---|
| ORIGINAL DATA S(j) | S(1) | S(2) | S(3) | ... |
| RANDOM NUMBER R(j) | R(1) | R(2) | R(3) | ... |
| DIVIDED PARTIAL DATA D(1,j) | S(1)*R(1)*R(2)*R(3) | S(2) | *R(2) | S(3)*R(1) | *R(3) | ... |
| DIVIDED PARTIAL DATA D(2,j) | S(1)*R(1)*R(2) | S(2)*R(1)*R(2)*R(3) | S(3) | *R(3) | ... |
| DIVIDED PARTIAL DATA D(3,j) | S(1)*R(1) | S(2) | *R(2)*R(3) | S(3)*R(1)*R(2)*R(3) | ... |
| DIVIDED PARTIAL DATA D(4,j) | R(1) | R(2) | R(3) | ... |

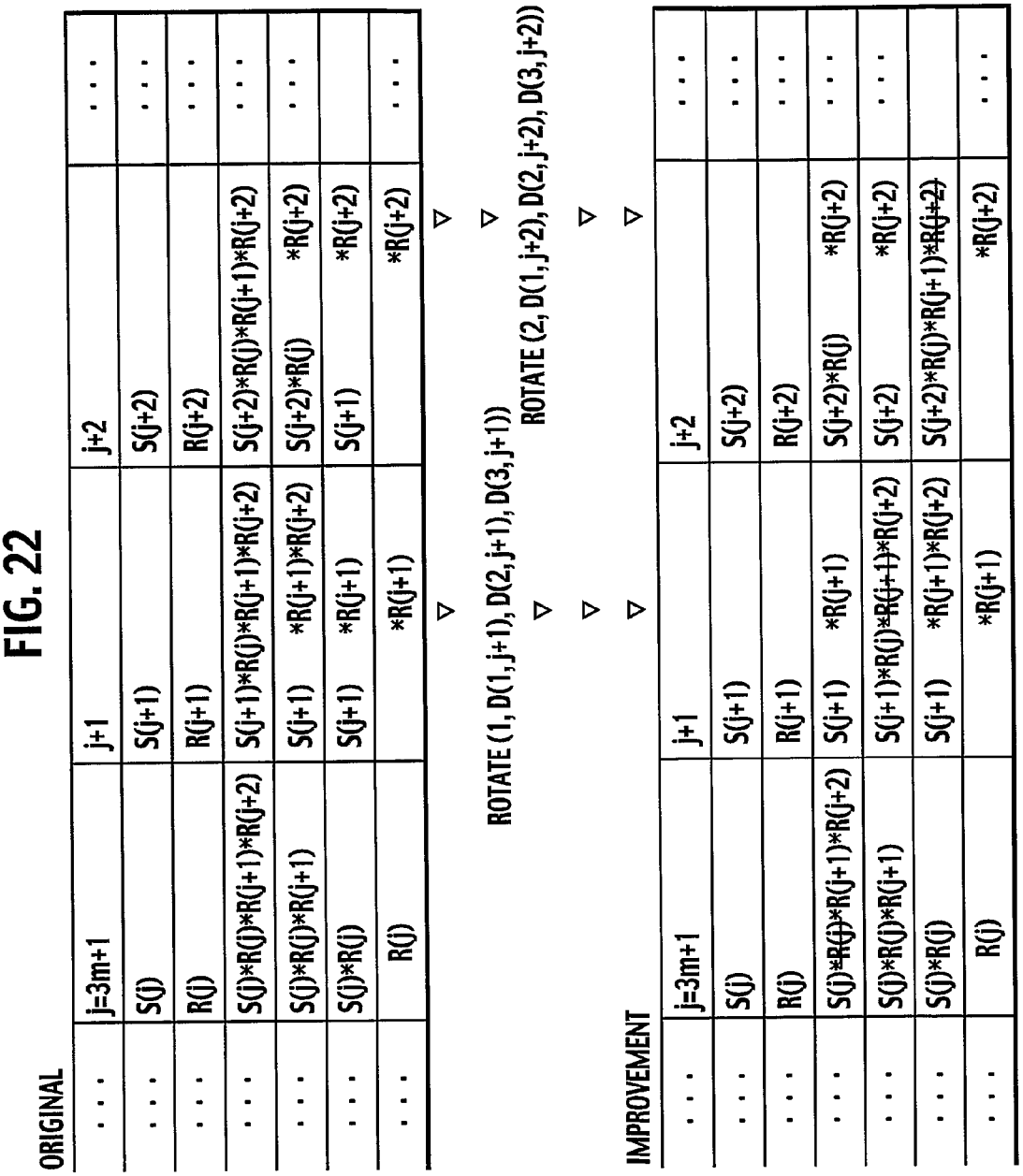

FIG. 23

ORIGINAL

| VALUE OF j | 1 | 2 | 3 | 4 | ... |
|---|---|---|---|---|---|
| ORIGINAL DATA S(j) | S(1) | S(2) | S(3) | S(4) | ... |
| RANDOM NUMBER R(j) | R(1) | R(2) | R(3) | | ... |
| DIVIDED PARTIAL DATA D(1,j) | S(1)*R(1)*R(2)*R(3)*R(4) | S(2)*R(1)*R(2)*R(3)*R(4) | S(3)*R(1)*R(2)*R(3)*R(4) | S(4)*R(1)*R(2)*R(3)*R(4) | ... |
| DIVIDED PARTIAL DATA D(2,j) | S(1)*R(1)*R(2)*R(3) | *R(2)*R(3)*R(4) | S(3)*R(1) | S(4)*R(1)*R(2) | ... |
| DIVIDED PARTIAL DATA D(3,j) | S(1)*R(1)*R(2) | S(2) | *R(3)*R(4) | S(4)*R(1) | ... |
| DIVIDED PARTIAL DATA D(4,j) | S(1)*R(1) | S(2) | *R(3) | S(4) | ... |
| DIVIDED PARTIAL DATA D(5,j) | R(1) | *R(2) | *R(3) | *R(4) | ... |

▽  ▽  ▽  ▽
ROTATE (1, D(1, 2), D(2, 2), (3, 2), D(4, 2))
▽  ▽  ▽  ▽
ROTATE (2, D(1, 3), D(2, 3), (3, 3), D(4,3))
▽  ▽  ▽  ▽
ROTATE (3, D(1, 4), D(2, 4), (3, 4), D(4, 4))
▽  ▽  ▽  ▽

IMPROVEMENT

| VALUE OF j | 1 | 2 | 3 | 4 | ... |
|---|---|---|---|---|---|
| ORIGINAL DATA S(j) | S(1) | S(2) | S(3) | S(4) | ... |
| RANDOM NUMBER R(j) | R(1) | R(2) | R(3) | | ... |
| DIVIDED PARTIAL DATA D(1,j) | S(1)*R(1)*R(2)*R(3)*R(4) | S(2) | S(3) | S(4)*R(1)*R(2) | ... |
| DIVIDED PARTIAL DATA D(2,j) | S(1)*R(1)*R(2)*R(3) | S(2)*R(1)*R(2)*R(3)*R(4) | S(3) | S(4)*R(1) | ... |
| DIVIDED PARTIAL DATA D(3,j) | S(1)*R(1)*R(2) | S(2)*R(1)*R(2)*R(3)*R(4) | S(3)*R(1) | S(4) | ... |
| DIVIDED PARTIAL DATA D(4,j) | S(1)*R(1) | S(2) | S(3)*R(1) | S(4)*R(1)*R(2)*R(3)*R(4) | ... |
| DIVIDED PARTIAL DATA D(5,j) | R(1) | *R(2) | *R(3) | *R(4) | ... |

SECRET INFORMATION MANAGEMENT SCHEME BASED ON SECRET SHARING SCHEME

TECHNICAL FIELD

The present invention relates to a secret information management scheme based on a secret sharing scheme for managing a secret information of a user.

BACKGROUND ART

In conjunction with the advance of the IT (Information Technology), there are increasing opportunities for receiving desired services by using a portable telephone or portable information terminal carrying a credit card number, and an IC card carrying a PKI secret key, etc. For example, there are many existing services in which a user can log-in by using a password of the user and view information, or purchase goods by using a credit card number of the user.

In such cases, if the user loses the portable telephone or portable information terminal and the IC card which store the above described secret information (such as a password, a credit card number, a PKI secret key, etc.), there is a need to have that secret information invalidated and a new secret information re-issued by reporting the loss to the issuer.

However, when the user loses the own secret information, there is a problem that the lost secret information must be invalidated while changing the secret information, for the purpose of maintaining the security. There is also a problem that the user cannot receive services until the secret information is re-issued because the secret information is to be changed.

DISCLOSURE OF THE INVENTION

It is therefore an object of the present invention to provide a secret information management scheme in which the user can receive services without changing the secret information even when the user loses the own portable telephone, portable information terminal or IC card.

According to one aspect of the present invention, there is provided a secret information management system for managing a secret information of a user, comprising: a data division unit configured to divide the secret information into a plurality of divided data by using a secret sharing scheme, such that the secret information can be recovered from a prescribed number of the divided data; a divided data storing unit configured to store a part of the plurality of divided data into a terminal of the user as user's divided data, and a rest of the plurality of divided data into one or more of deposit servers; a data re-division unit configured to generate a plurality of re-divided data different from the plurality of divided data obtained by the data division unit, from a combination of the prescribed number of the divided data among the divided data stored in the deposit servers by using the secret sharing scheme; and a re-divided data storing unit configured to store a part of the plurality of re-divided data into the terminal as newly generated user's divided data and a rest of the plurality of re-divided data into the deposit servers as newly generated divided data.

According to another aspect of the present invention, there is provided a secret information management method for managing a secret information of a user, comprising the steps of: dividing the secret information into a plurality of divided data by using a secret sharing scheme, such that the secret information can be recovered from a prescribed number of the divided data; storing a part of the plurality of divided data into a terminal of the user as user's divided data, and a rest of the plurality of divided data into one or more of deposit servers; generating a plurality of re-divided data different from the plurality of divided data obtained by the dividing step, from a combination of the prescribed number of the divided data among the divided data stored in the deposit servers by using the secret sharing scheme; and storing a part of the plurality of re-divided data into the terminal as newly generated user's divided data and a rest of the plurality of re-divided data into the deposit servers as newly generated divided data.

According to another aspect of the present invention, there is provided a computer program product for causing a computer to function as a secret information management system for managing a secret information of a user, the computer program product comprising: a first computer program code for causing the computer to divide the secret information into a plurality of divided data by using a secret sharing scheme, such that the secret information can be recovered from a prescribed number of the divided data; a second computer program code for causing the computer to store a part of the plurality of divided data into a terminal of the user as user's divided data, and a rest of the plurality of divided data into one or more of deposit servers; a third computer program code for causing the computer to generate a plurality of re-divided data different from the plurality of divided data obtained by the first computer program code, from a combination of the prescribed number of the divided data among the divided data stored in the deposit servers by using the secret sharing scheme; and a fourth computer program code for causing the computer to store a part of the plurality of re-divided data into the terminal as newly generated user's divided data and a rest of the plurality of re-divided data into the deposit servers as newly generated divided data.

Other features and advantages of the present invention will become apparent from the following description taken in conjunction with the accompanying drawings.

BRIEF DESCRIPTION OF THE DRAWINGS

FIG. 8 is a table showing an example of divided partial data and their definition formula in the case of division into three according to the second embodiment of the present invention.

FIGS. 21 and 22 are a table showing an example of divided partial data and their definition formula in original and improved forms in the case of division into four according to the second embodiment of the present invention.

FIGS. 23 and 24 are a table showing an example of divided partial data and their definition formula in original and improved forms in the case of division into five according to the second embodiment of the present invention.

BEST MODE FOR CARRYING OUT THE INVENTION

Referring now to FIG. 1 to FIG. 4, the first embodiment of the present invention will be described in detail.

Figure 1:
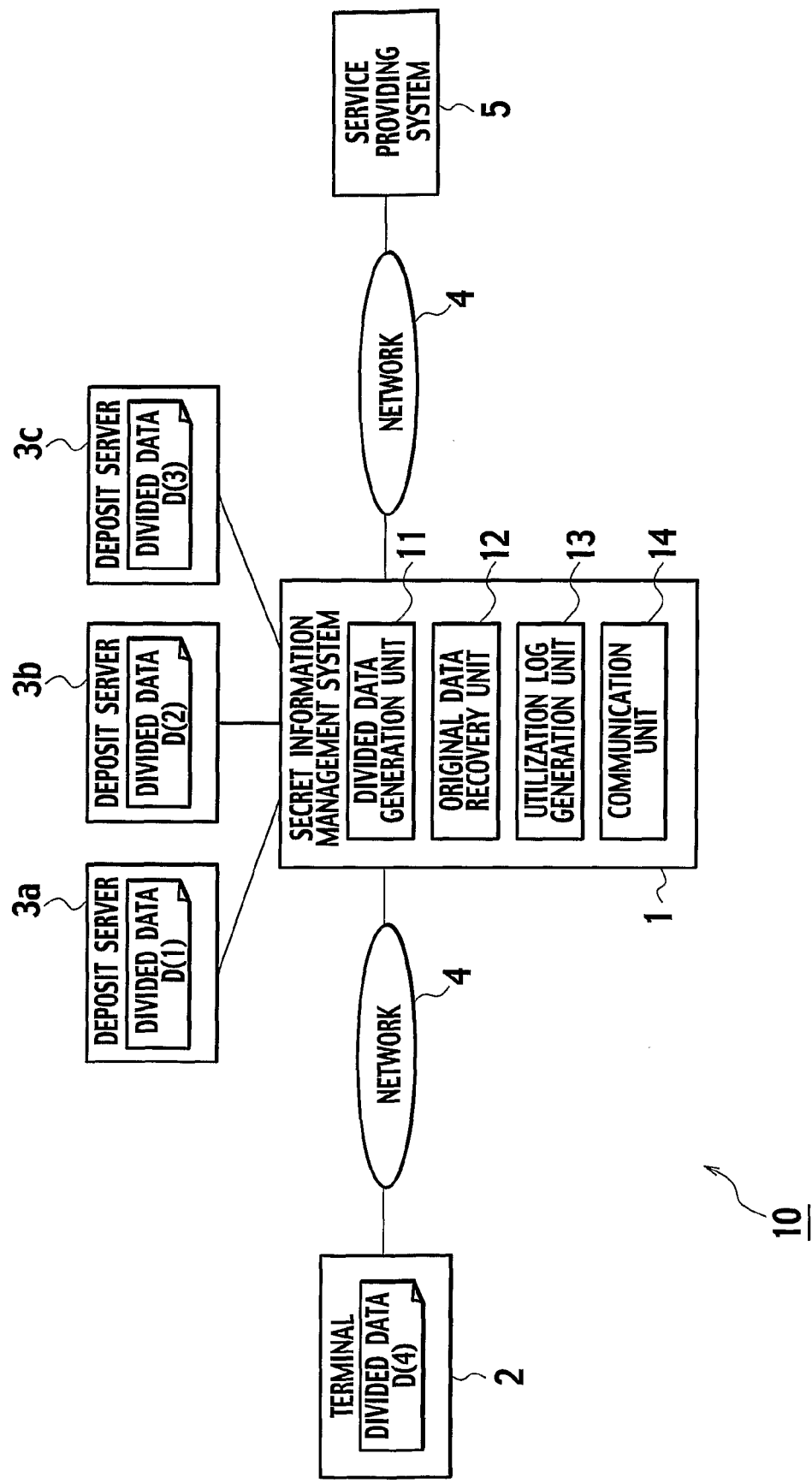
FIG. 1 is a block diagram showing an overall schematic configuration of a computer system using a secret information management system according to the first embodiment of the present invention.

FIG. 1 shows an overall schematic configuration of a computer system 10 using a secret information management system 1 according to the first embodiment.

As shown in FIG. 1, the secret information management system 1 is connected with a client terminal (which will be referred hereafter simply as a terminal) 2 owned by a user through a communication network 4 such as the Internet, and connected with a service providing system 5 for providing a prescribed service to the user through the communication network 4. The secret information management system 1 is also connected with a plurality (which is assumed to be three in this embodiment) of data depositing server computers (which will be referred hereafter simply as a deposit servers) 3a, 3b and 3c which are formed by mutually independent hardwares.

Note that the secret information in this embodiment refers to a personal information such as a password, a credit card number, a PKI secret key, etc., which is necessary for the user to utilize the service providing system 5.

In the computer system 10 in this configuration, when the terminal 2 transmits to the secret information management system 1 the secret information S that is necessary at a time of receiving the prescribed service from the service providing system 5, the secret information S is divided into a plurality of data by using the secret sharing scheme at the secret information management system 1, and the divided data are respectively transmitted to the deposit servers 3a, 3b and 3c and the terminal 2 such that the divided data are respectively deposited in the deposit servers 3a, 3b and 3c and the terminal 2. As a result, the secret information S is registered at the secret information management system 1 and the preparation for the service utilization by the user is completed. Note that, in FIG. 1, the secret information management system 1 divides the secret information S from the terminal 2 into four divided data D(1), D(2), D(3) and D(4), and deposit them respectively in the plurality of deposit servers 3a, 3b and 3c and the terminal 2.

Also, at a time of the service utilization, when the divided data D(4) maintained by the user is transmitted from the terminal 2 to the secret information management system 1, the secret information management system 1 recovers the original secret information S from a prescribed combination of that divided data D(4) and the divided data D(1), D(2) and D(3) of the deposit servers 3a, 3b and 3c by using the secret sharing scheme, and transmits that secret information S to the service providing system 5. In this way, when the properness of the secret information S is confirmed, it becomes possible for the user to receive the prescribed service.

The secret information management system 1 has a detailed configuration which has a divided data generation unit 11 for dividing the secret information S into a plurality of divided data D by using the secret sharing scheme, an original data recovery unit 12 for recovering the original data (secret information) S from a plurality of divided data D, a utilization log generation unit 13 for generating a service utilization log for recording the fact that the secret information management system 1 transmitted the secret information S to the service providing system 5, and a communication unit 14 for transmitting or receiving data with respect to the terminal 2, the deposit servers 3a, 3b and 3c, and the service providing system 5.

Also, the terminal 2 can be a portable recording medium such as a portable information terminal, a portable telephone, an IC card which can be carried around by the user, but it can also be a computer device not intended for the mobile use.

Here, each of the secret information management system 1, the terminal 2, the deposit servers 3a, 3b and 3c, and the service providing system 5 is formed by an electronic device having at least a central processing unit (CPU) with a calculation function and a control function, and a main memory unit (memory) such as RAM with a function for storing programs and data. Such a device and the system may also have a auxiliary memory unit such as hard disk, besides the main memory unit.

Also, the program for executing various processing according to this embodiment is stored in the main memory unit or the hard disk (i.e., one type of a non-transitory computer-readable medium). It is also possible to record this program in the computer readable recording medium such as hard disk, flexible disk, CD-ROM, MO, DVD-ROM, etc. (i.e., other types of non-transitory computer-readable media), and it is also possible to deliver this program through the communication network.

Figure 2:
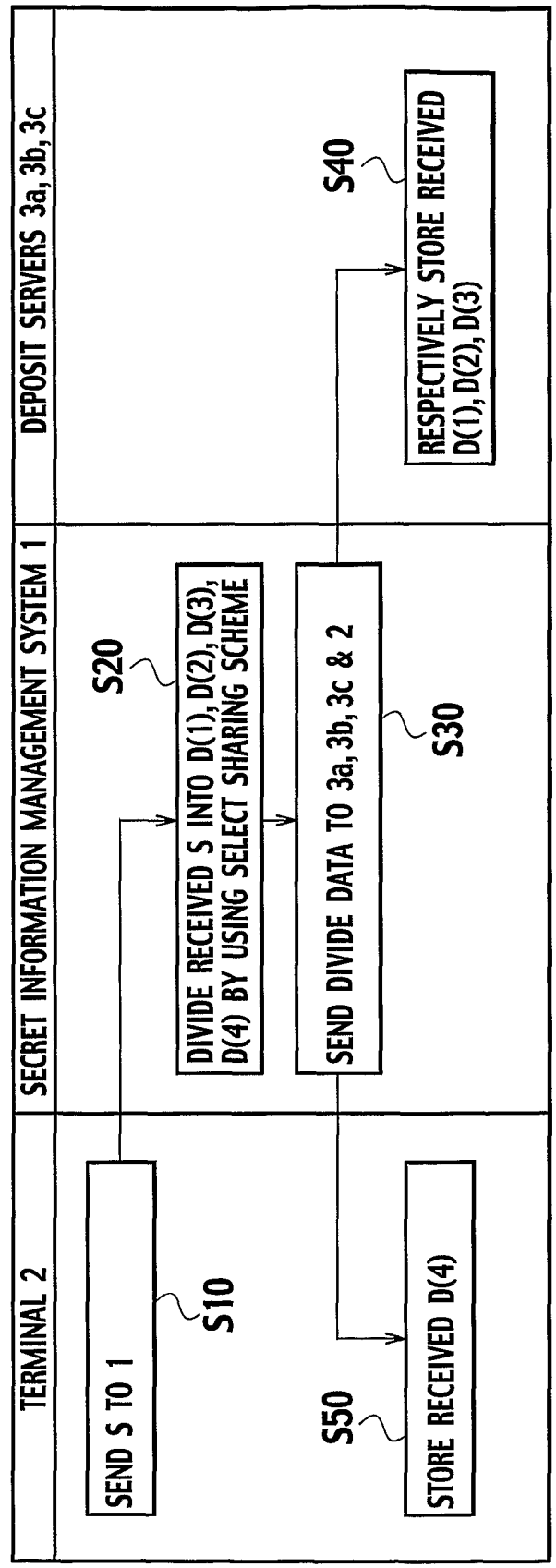
FIG. 2 is a sequence chart showing a processing for registering a secret information by the secret information management system shown in FIG. 1.
Figure 3:
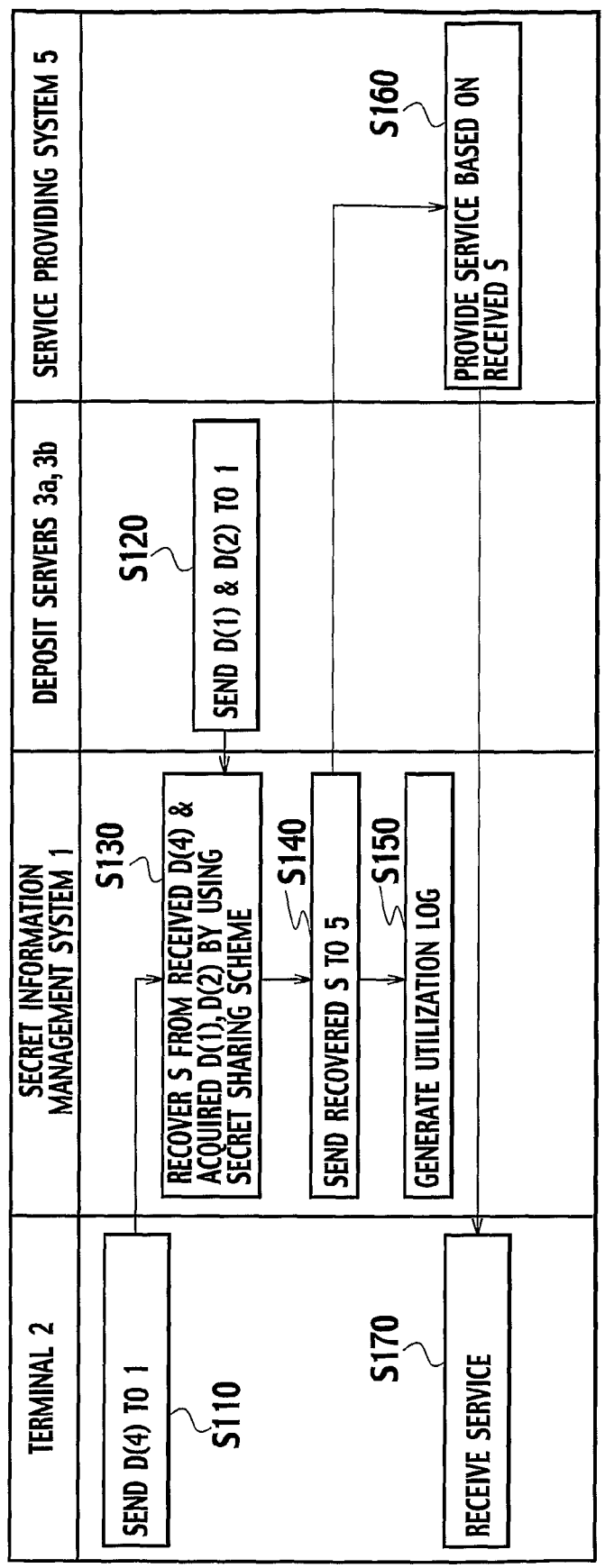
FIG. 3 is a sequence chart showing a processing by the secret information management system shown in FIG. 1 at a time of service utilization.
Figure 4:
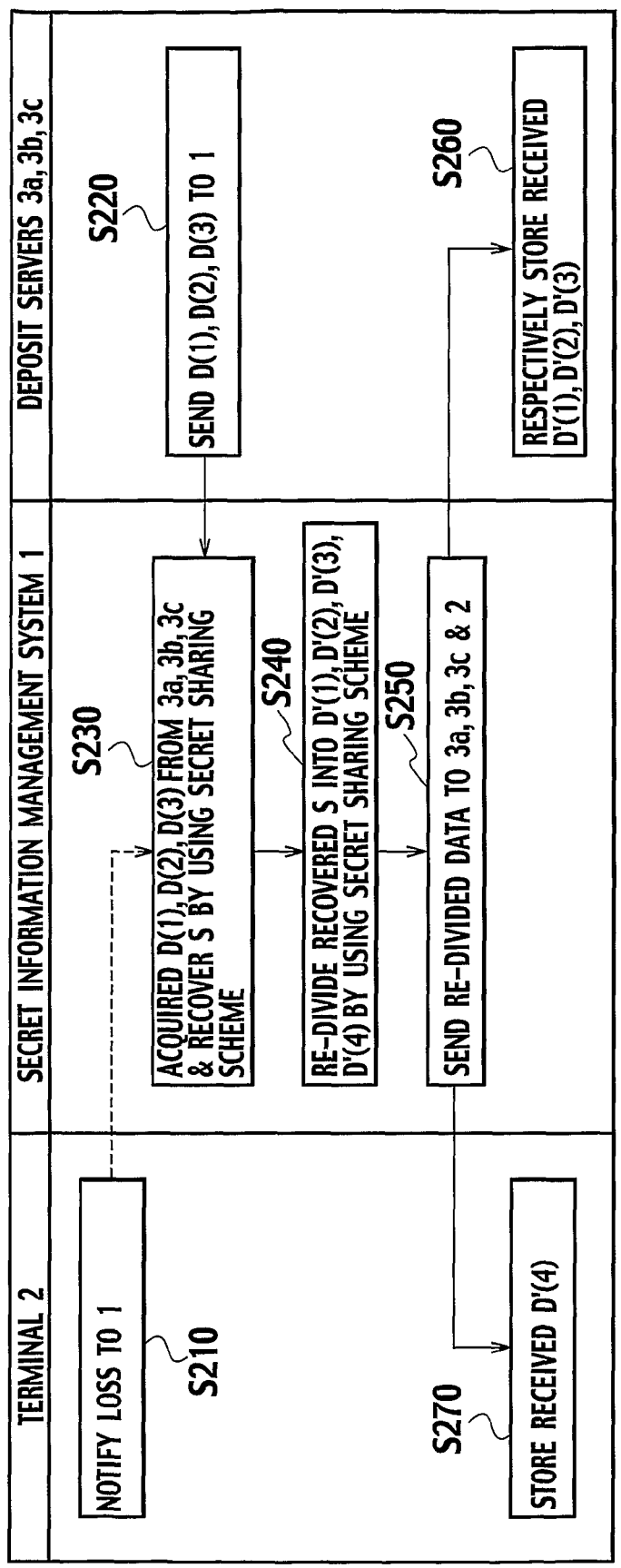
FIG. 4 is a sequence chart showing a processing by the secret information management system shown in FIG. 1 when a part of a secret information owned by a user is lost.

Next, the operation of the entire computer system 10 using the secret information management system 1 according to this embodiment will be described. Here, FIG. 2 shows an operation by which the user registers the secret information S in the secret information management system 1, FIG. 3 shows an operation of the secret information management system 1 when the user utilizes the service, and FIG. 4 shows an operation of the secret information management system 1 when the user lost the user's own divided data D.

(1) Secret Information Registration Processing

First, the user transmits the secret information S from the terminal 2 through the communication network 4 to the secret information management system 1 (step S10). Upon receiving the secret information S, the secret information management system 1 divides the secret information S into four data (divided data) D(1), D(2), D(3) and D(4) by using the secret sharing scheme (step S20).

Here, the divided data generation processing based on the secret sharing scheme at the step S20 will be described in detail.

For example, there is the Shamir's secret sharing scheme {(k,n) threshold scheme, where the number of division n is assumed to be 4 and the recoverable number k is assumed to 3 here} based on the second degree polynomial $F(x)=ax^2+bx+S$ (mod p), where S is the secret information that is the original data, and F(x) is the divided data, a, b and p are numbers arbitrarily determined at a time of dividing the secret information S such that p is a prime number larger than a, b and S.

In this case, by the divided data generation processing of the secret information management system 1, the divided data F(1), F(2), F(3) and F(4) {corresponding to the above described divided data D(1), D(2), D(3) and D(4)} are produced according to the following equations (1) to (4).

$$F(1)=a+b+S(\mod p) \quad (1)$$

$$F(2)=4a+2b+S(\mod p) \quad (2)$$

$$F(3)=9a+3b+S(\mod p) \quad (3)$$

$$F(4)=16a+4b+S(\mod p) \quad (4)$$

Among these divided data F(1), F(2), F(3) and F(4), when more than or equal to k=3 sets of the divided data {F(1), F(2), F(4), for example} are collected, it is possible to obtain the original data S by simultaneously solving them (equations (1), (2) and (4), for example). However, even when less than or equal to k−1 sets of the divided data are collected, the original data S cannot be recovered.

Next, the secret information management system 1 transmits the divided data generated in this way respectively to the deposit servers 3a, 3b and 3c and the terminal 2 through the communication network 4 (step S30).

Next, the deposit servers 3a, 3b and 3c respectively store the received divided data D(1), D(2) and D(3) into their memory devices such as hard disks (step S40). Also, the terminal 2 stores the received divided data D(4) into its memory device such as hard disk (step S50).

In this way, even when there is a loss, destruction, etc. occurs for any one of the divided data of the terminal 2 and the deposit servers 3a, 3b and 3c, the original secret information 3 can be recovered according to the remaining three divided data (in the case where the number of division is 4 and the recoverable number is 3 in the Shamir's secret sharing scheme).

(2) Service Utilization Processing

In the case where the user utilizes the service providing system 5, first, the divided data D(4) maintained at the terminal 2 is transmitted to the secret information management system 1 through the communication network 4 (step S110).

Upon receiving the divided data D(4) from the terminal 2, the secret information management system 1 requests the remaining divided data D(1) and D(2) to the deposit servers 3 (in the case where the number of division is 4 and the recoverable number is 3 in the Shamir's secret sharing scheme), and receives these divided data D(1) and D(2) (step S120). Here, an arbitrary combination of three divided data can be used in this case, so that besides a combination of D(1), D(2) and D(4) described above, it is also possible to use a combination of D(1), D(2) and D(3), a combination of D(1), D(3) and D(4), or a combination of D(2), D(3) and D(4).

Next, the secret information management system 1 recovers the secret information S from the divided data D(1), D(2) and D(4) by using the secret sharing scheme (step S130), Then, the recovered secret information S is transmitted to the service providing system 5 (step S140), and the utilization log is generated by recording the fact that the secret information S is recovered and transmitted (step S150).

Upon receiving the secret information S from the secret information management system 1, the service providing system 5 judges the properness of this secret information S, and provides the service to the terminal 2 through the communication network 4 (step S160) such that the user can receive the desired service (step S170).

(3) Processing at a Time of Divided Data Loss

In the case where the user lost the divided data D(4) (the case where the terminal 2 that stores the divided data D(4) is lost, for example), first, the user reports this fact to the secret information management system 1 (by calling an operator of the secret information management system 1, for example) (step S210).

In response, the secret information management system 1 requests the divided data to the deposit servers 3a, 3b and 3c, and receives the divided data D(1), D(2) and D(3) respectively from the deposit servers 3a, 3b and 3c (in the case where the number of division is 4 and the recoverable number is 3 in the Shamir's secret sharing scheme) (step S220).

Next, the secret information management system 1 recovers the secret information S from the divided data D(1), D(2) and D(3) by using the secret sharing scheme (step S230). Then, the recovered secret information S is newly divided into four data (re-divided data) D'(1), D'(2), D'(3) and D'(4) by using the secret sharing scheme again (step S240).

Here, the re-divided data D'(1), D'(2), D'(3) and D'(4) are different data from the initially generated divided data D(1), D(2), D(3) and D(4) respectively. More specifically, the re-divided data generated by using a' and b' different from a and b used at a time of the initial division, in the above described second degree polynomial $F(x)=ax^2+bx+S$ (mod p).

Next, the secret information management system 1 transmits the re-divided data generated in this way respectively to the deposit servers 3a, 3b and 3c and the terminal 2 (the terminal 2 newly purchased by the user in the case where the user has lost the terminal 2 that stores the divided data D(4)) through the communication network 4 (step S250).

Next, the deposit servers 3a, 3b and 3c respectively store the received re-divided data D'(1), D'(2) and D'(3) into their memory devices such as hard disks (step S260). Also, the terminal 2 stores the received re-divided data D'(4) into its memory device such as hard disk (step S270). In this way, it becomes possible for the user to utilize the service again.

Thus, according to this embodiment, the secret information S that is necessary at a time of receiving the prescribed service is divided into a plurality of divided data by using the secret sharing scheme, and the user is required to maintain only a part of the divided data, so that the secret information can be recovered from the remaining divided data even when the divided data maintained by the user is lost, and then the secret information S is re-divided by using the secret sharing scheme and the user is newly required to maintain only a part of the re-divided data, so that there is no need to change the secret information S.

As a result, even when the user loses the user's own divided data, it is possible to receive the service again by simply reporting the loss, without requiring the processing for re-issuing the secret information S.

Also, even when the third person who acquired the lost divided data accesses the secret information management system 1, the secret information S cannot be recovered and the service cannot be utilized, so that the safety is secured.

Moreover, the user's utilization log is maintained at the secret information management system 1, so that even if the third person acquires the lost divided data and illegally utilize the service during a period since the user loses the divided data until the user reports the loss, the presence or absence of the illegal utilization can be judged according to the utilization log.

Note that, in the above, the secret information S is given from the terminal 2 to the secret information management system 1 through the communication network 4, but this embodiment is not limited to this case, and it is also possible to use a mechanism other than the communication network 4, such as mailing a recording medium that records the secret information S, for example. Similarly, in the above, the divided data to be maintained by the user is received through the communication network 4, but this embodiment is not limited to this case, and it is also possible to use a mechanism other than the communication network 4, such as mailing a recording medium that records the divided data, for example.

Also, in this embodiment, the Shamir's secret sharing scheme {(k,n) threshold scheme, where the number of division n is assumed to be 4 and the recoverable number k is assumed to 3} is used as the secret sharing scheme, but this embodiment is not limited to this case, and it is possible to use the number of division other than that described above or the secret sharing scheme other than that described above.

Also, in the above, at a time of the service utilization by the user, the secret information management system 1 recovered the secret information S, but this embodiment is not limited to this case, and it is also for the terminal 2 of the user to recover the secret information S from the divided data stored at the terminal 2 and the divided data acquired from the secret information management system 1 by using the secret sharing scheme, and transmit that secret information to the service providing system 5. Note however that, in this case, if the user loses the terminal 2 while the recovered secret information S is still stored therein, the problem to be solved by the present invention cannot be solved, so that there is a need to provide a mechanism for deleting the secret information S from the terminal 2 immediately after transmitting it to the service providing system 5, or a mechanism for preventing the illegal reading of the data of the terminal 2 by the third person.

Moreover, in the above, the re-division processing is carried out upon a request from the user, but it is also possible for the secret information management system 1 to carry out the re-division processing voluntarily at a prescribed timing.

Referring now to FIG. 5 to FIG. 17 and FIG. 20 to FIG. 24, the second embodiment of the present invention will be described in detail.

<System Configuration>

Figure 5:
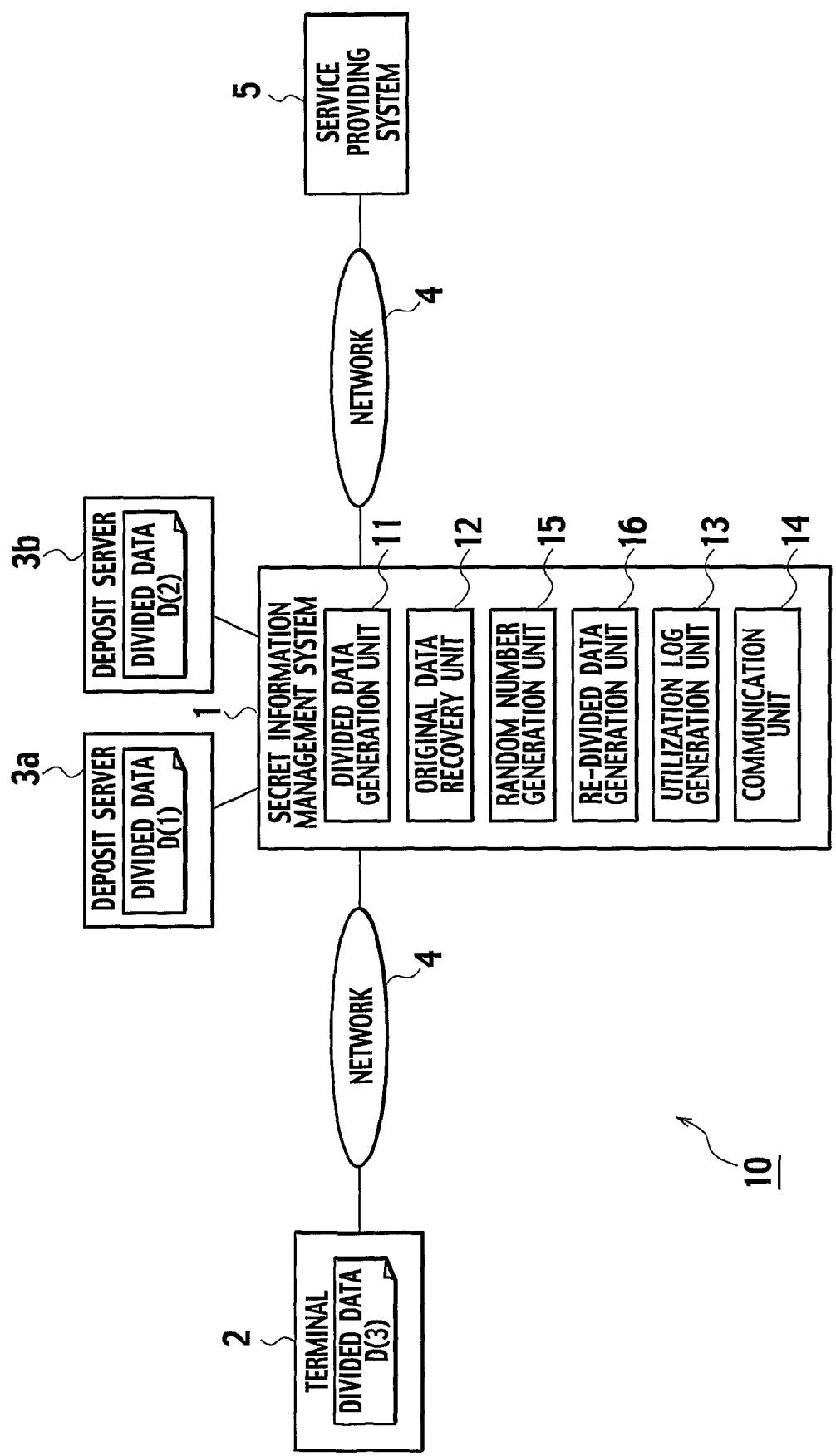
FIG. 5 is a block diagram showing an overall schematic configuration of a computer system using a secret information management system according to the second embodiment of the present invention.

FIG. 5 shows an overall schematic configuration of a computer system 10 using a secret information management system 1 according to the second embodiment.

As shown in FIG. 5, the secret information management system 1 is connected with a client terminal (which will be referred hereafter simply as a terminal) 2 owned by a user through a communication network 4 such as the Internet, and connected with a service providing system 5 for providing a prescribed service to the user through the communication network 4. The secret information management system 1 is also connected with a plurality (which is assumed to be two in this embodiment) of data depositing server computers (which will be referred hereafter simply as deposit servers) 3a and 3b which are formed by mutually independent hardwares.

Note that the secret information in this embodiment refers to a personal information such as a password, a credit card number, a PKI secret key, etc., which is necessary for the user to utilize the service providing system 5.

In the computer system 10 in this configuration, when the terminal 2 transmits to the secret information management system 1 the secret information S that is necessary at a time of receiving the prescribed service from the service providing system 5, the secret information S is divided into a plurality of data by using the secret sharing scheme based on the special secret sharing algorithm (which will be referred hereafter as the secret sharing scheme A) to be described below, at the secret information management system 1, and the divided data are respectively transmitted to the deposit servers 3a and 3b and the terminal 2 such that the divided data are respectively deposited in the deposit servers 3a and 3b and the terminal 2. As a result, the secret information S is registered at the secret information management system 1 and the preparation for the service utilization by the user is completed. Note that, in FIG. 5, the secret information management system 1 divides the secret information S from the terminal 2 into three divided data D(1), D(2) and D(3), and deposit them respectively in the plurality of deposit servers 3a and 3b and the terminal 2.

Also, at a time of the service utilization, when the divided data D(3) maintained by the user is transmitted from the terminal 2 to the secret information management system 1, the secret information management system 1 recovers the original secret information S from arbitrary two of that divided data D(3) and the divided data D(1) and D(2) of the deposit servers 3a and 3b by using the secret sharing scheme A, and transmits that secret information S to the service providing system 5. In this way, it becomes possible for the user to receive the prescribed service.

Note also that, in this embodiment, the exemplary case of depositing the secret information S by dividing it into three will be described, but the present invention is not limited to this case of dividing the secret information S into three, and the present invention is also applicable to the case of the division into n (n is an integer greater than or equal to 2). Also, the number of the divided data to be transmitted to the terminal 2 is not necessarily one and can be plural. Moreover, in this embodiment, the divided data D(1) and D(2) are allocated to the deposit servers 3 and the divided data D(3) is allocated to the terminal 2, but it is possible to allocate any divided data to any one of the deposit servers 3 and the terminal 2.

The secret information management system 1 has a detailed configuration which has a divided data generation unit 11 for dividing the secret information S into a plurality of divided data D by using the secret sharing scheme A, an original data recovery unit 12 for recovering the original data (secret information) S from a plurality of divided data D by using the secret sharing scheme A, a random number generation unit 15 for generating a random number R to be used in generating a plurality of divided data D from the secret information S and a random number R' to be used in generating the re-divided data D', a re-divided data generation unit 16 for generating a plurality of re-divided data D' from the divided data deposited in the deposit servers 3 by using the secret sharing scheme A, when the user lost the user's own divided data, a utilization log generation unit 13 for generating a utilization log for recording the fact that the secret information management system 1 transmitted the secret information S to the service providing system 5, and a communication unit 14 for transmitting or receiving data with respect to the terminal 2, the deposit servers 3a and 3b, and the service providing system 5.

Also, the terminal 2 can be a portable recording medium such as a portable information terminal, a portable telephone, an IC card which can be carried around by the user, but it can also be a computer device not intended for the mobile use.

Here, each of the secret information management system 1, the terminal 2, the deposit servers 3a and 3b, and the service providing system 5 is formed by an electronic device having at least a central processing unit (CPU) with a calculation function and a control function, and a main memory unit (memory) such as RAM with a function for storing programs and data. Such a device and the system may also have a auxiliary memory unit such as hard disk, besides the main memory unit.

Also, the program for executing various processing according to this embodiment is stored in the main memory unit or the hard disk. It is also possible to record this program in the computer readable recording medium such as hard disk, flexible disk, CD-ROM, MO, DVD-ROM, etc., and it is also possible to deliver this program through the communication network.

<Secret Sharing Scheme A>

Here, the secret sharing scheme A based on the special secret sharing algorithm according to this embodiment will be described in detail.

In the division and the recovery of the original data (corresponding to the secret information S) according to this embodiment, the original data is divided into the divided data in a desired number of division according to a desired processing unit bit length, and this processing unit bit length can be set to an arbitrary value. Also, the original data is partitioned into original partial data of the processing unit bit length, and divided partial data in a number less than the number of division by one are generated from each original partial data, so that when the bit length of the original data is not an integer multiple of (number of division−1) times the processing unit bit length, the bit length of the original data is adjusted to become an integer multiple of (number of division−1) times the processing unit bit length by filling up the tail of the original data by 0, for example.

Also, the random number mentioned above is generated by the random number generation unit 15 as (number of division−1) sets of random number partial data having a bit length equal to the processing unit bit length, in correspondence to (number of division−1) sets of the original partial data. Namely, the random number is generated and partitioned by the processing unit bit length as (number of division−1) sets of the random number partial data having a bit length equal to the processing unit bit length. In addition, the original data are divided into the divided data in the desired number of division according to the processing unit bit length, and each one of these divided data is also generated as (number of division−1) sets of divided partial data having a bit length equal to the processing unit bit length in correspondence to (number of division−1) sets of the original partial data. Namely, each one of the divided data is generated and partitioned by the processing unit bit length as (number of division−1) sets of the divided partial data having a bit length equal to the processing unit bit length.

Note that, in the following description, the above described original data, random number, divided data, number of division and processing unit bit length will be denoted as S, R, D, n and b, respectively, and variables i (=1 to n) and j (=1 to n−1) will be used as variables for indicating one of a plurality of data or random numbers, each one of (number of division n−1) sets of the original partial data, (number of division n−1) sets of the random number partial data, and n sets of the divided data D will be denoted as S(j), R(j) and D(j), respectively, and (n−1) sets of divided partial data that constitute each divided data D(i) will be denoted as D(i,j). Namely, S(j) denotes the j-th original partial data in the case where the original data S is partitioned by the processing unit bit length from the top and the resulting original partial data are sequentially numbered.

Using these notations, the original data, the random number data, the divided data, and their constituents, i.e. the original partial data, the random number partial data and the divided partial data, can be expressed as follows.

$$\text{Original data } S = (n-1) \text{ sets of original partial data } S(j)$$
$$= S(1), S(2), \cdots, S(n-1)$$

$$\text{Random number } S = (n-1) \text{ sets of random number partial data } R(j)$$
$$= R(1), R(2), \cdots, R(n-1)$$

$$n \text{ sets of divided data} = D(1), D(2), \cdots, D(n)$$

$$\text{Each divided partial data } D(i, j) = D(1, 1), D(1, 2), \cdots, D(1, n-1)$$
$$D(2, 1), D(2, 2), \cdots, D(2, n-1)$$
$$\cdots \quad \cdots \quad \cdots$$
$$D(n, 1), D(n, 2), \cdots, D(n, n-1)$$

$$(i = 1 \text{ to } n), (j = 1 \text{ to } n-1)$$

This embodiment is characterized by realizing the division of the original data by carrying out the exclusive OR (XOR) calculation of the original partial data and the random number partial data with respect to the plurality of partial data in the processing unit bit length as described above, or more specifically, by using a definition formula formed by the exclusive OR (XOR) calculation of the original partial data and the random number partial data. In contrast to the above described conventional method using the polynomial and the residue calculation for the data division processing, this embodiment uses the exclusive OR (XOR) calculation which is a bit calculation suitable for the computer processing so that it does not require a high speed and high performance calculation processing power, the divided data can be generated for a large capacity data by repeating the simple calculation processing, and the memory capacity required for maintaining the divided data becomes smaller than the capacity that is linearly proportional to the number of division. In addition, the divided data can be generated by the stream processing in which the calculation processing is carried out sequentially from the top of the data in units of a prescribed arbitrary length.

Note that the exclusive OR (XOR) calculation used in this embodiment will be denoted by a symbol "*" in the following description, and the calculation results according to the calculation rules for different bits of this exclusive OR calculation are as follows.

calculation result of 0*0 is 0 calculation result of 0*1 is 1 calculation result of 1*0 is 1 calculation result of 1*1 is 0

Also, in the XOR calculation, the commutativity and the associativity hold. Namely, it is mathematically proven that the following equations hold.

$a*b=b*a$ $(a*b)*c=a*(b*c)$

In addition, a*a=0 and a*0=0*a=a also hold. Here, a, b and c represent bit sequences of the same length, and 0 represents a bit sequence consisting of "0" which has the same length as a, b and c.

Next, the operation in this embodiment will be described with references to the drawings. First, the definition of symbols used in the flow charts of FIGS. 6 to 10, 12 and 14 will be described.

$$\prod_{i=1}^{n} A(i) \text{ indicates } A(1)*A(2)*\cdots*A(n) \quad (1)$$

(2) c(j,i,k) is an (n−1)×(n−1) matrix which is defined as a value of the i-th row and the k-th column of $U[n-1,n-1] \times (P[n-1,n-1])^{\wedge}(j-1)$ Then Q(j,i,j) is defined as follows.

$Q(j,i,k)=R((n-1) \times m+k)$ when $c(j,i,k)=1$ $Q(j,i,k)=0$ when $c(j,i,k)=0$ where m≧0 is an integer.

(3) U[n,n] is an n×n matrix with u(i,j) indicating a value of the i-th row and the j-th column given by:

$u(i,j)=1$ when $i+j \leq n+1$ $u(i,j)=0$ when $i+j > n+1$ and this matrix will be referred to as an "upper triangular matrix". More specifically, this is a matrix such as the following.

$$U = [3,3] = \begin{pmatrix} 1 & 1 & 1 \\ 1 & 1 & 0 \\ 1 & 0 & 0 \end{pmatrix}$$

$$U[4,4] = \begin{pmatrix} 1 & 1 & 1 & 1 \\ 1 & 1 & 1 & 0 \\ 1 & 1 & 0 & 0 \\ 1 & 0 & 0 & 0 \end{pmatrix}$$

(4) P[n,n] is an n×n matrix with p(i,j) indicating a value of the i-th row and the j-th column given by:

$p(i,j)=1$ when $j=i+1$ $p(i,j)=1$ when $i=1, j=n$ $p(i,j)=0$ otherwise and this matrix will be referred to as an "rotation matrix". More specifically, this is a matrix such as the following.

$$P[3,3] = \begin{pmatrix} 0 & 1 & 0 \\ 0 & 0 & 1 \\ 1 & 0 & 0 \end{pmatrix}$$

$$P[4,4] = \begin{pmatrix} 0 & 1 & 0 & 0 \\ 0 & 0 & 1 & 0 \\ 0 & 0 & 0 & 1 \\ 1 & 0 & 0 & 0 \end{pmatrix}$$

When this rotation matrix is multiplied to another matrix from the right side, this rotation matrix has an effect of shifting the first column to the second column, the second column to the third column, n−1-th column to the n-th column, and n-th column to the first column in that another matrix. In other words, when the matrix P is multiplied to another matrix from the right side for plural times, each column of that another matrix will be "rotated" towards the right direction as much as that plural times.

(5) When A and B are n×n matrices, A×B indicates a product of matrices A and B. The calculation rule for components of the matrices is the same as the ordinary mathematics.

(6) When A is an n×n matrix and i is an integer, A^i indicates a product of i sets of the matrix A. Also, A^0 indicates a unit matrix E.

(7) The unit matrix E[n,n] is an n×n matrix with a value e(i,j) of the i-th row and j-th column given by:

$e(i,j)=1$ when $i=j$ $e(i,j)=0$ otherwise

More specifically, this is a matrix such as the following.

$$E[3,3] = \begin{pmatrix} 1 & 0 & 0 \\ 0 & 1 & 0 \\ 0 & 0 & 1 \end{pmatrix}$$

$$E[4,4] = \begin{pmatrix} 1 & 0 & 0 & 0 \\ 0 & 1 & 0 & 0 \\ 0 & 0 & 1 & 0 \\ 0 & 0 & 0 & 1 \end{pmatrix}$$

When A is an arbitrary n×n matrix, the unit matrix has the property that A×E=E×A=A.

Next, with references to FIGS. 6, 7 and 8, the processing for dividing the original data S will be described. This is the description of the function of the divided data generation unit 11 of the secret information management system 1.

Figure 6:
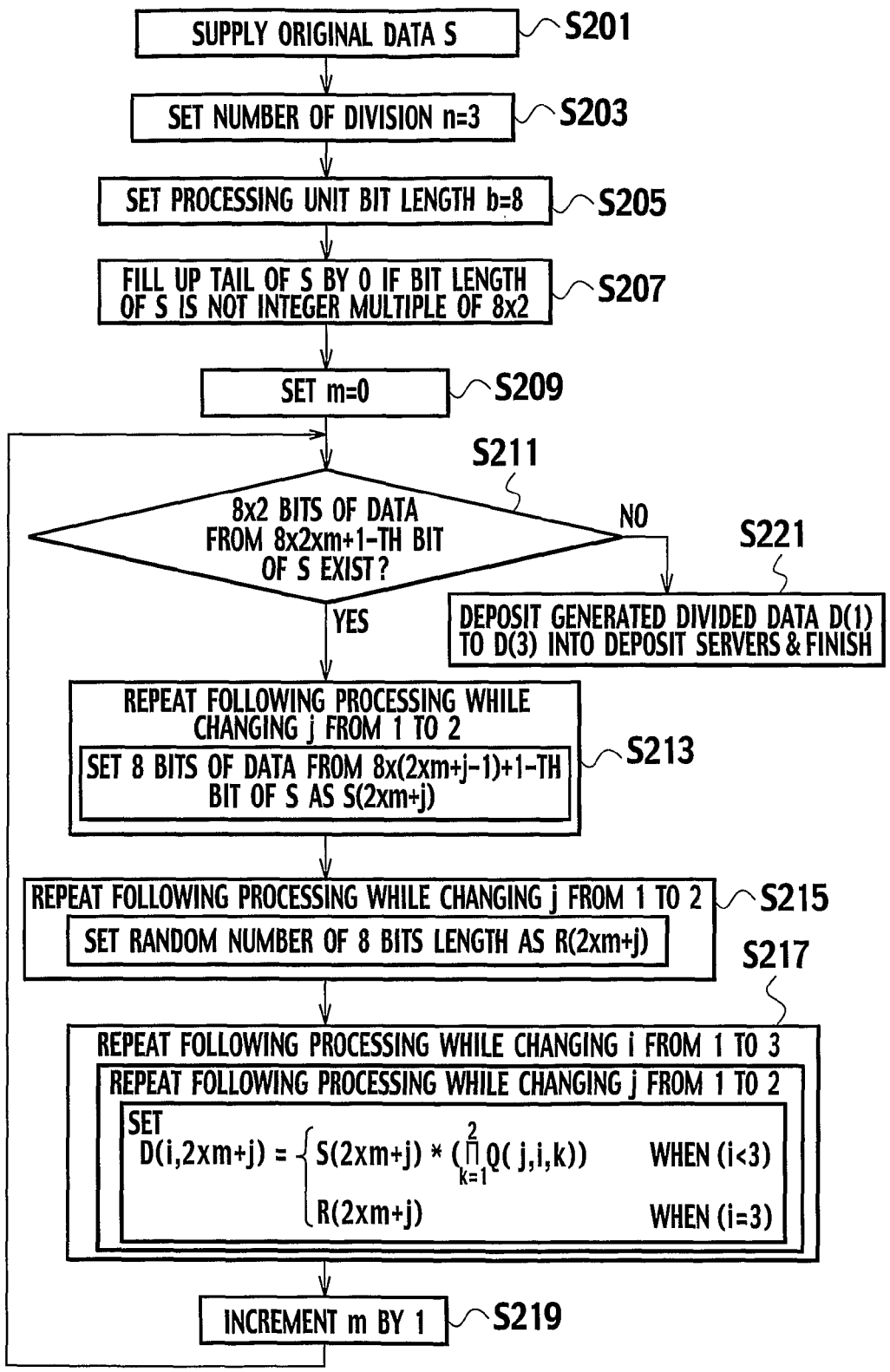
FIG. 6 is a flow chart showing a division processing by the secret information management system shown in FIG. 1, in the case where a number of division is three.

First, the original data S is given to the secret information management system 1 (step S201 of FIG. 6). Note that, in this example, the original data S is assumed to be 16 bits given by "10110010 00110111".

Next, the secret information management system 1 specifies the number of division n=3 (step S203). Note that the three divided data generated by the secret information management system 1 according to this number of division n=3 will be denoted as D(1), D(2) and D(3). These divided data D(1), D(2) and D(3) are all data with the 16 bits length which is the same bit length as the original data.

Then, the processing unit bit length b to be used in dividing the original data S is determined as 8 bits (step S205). This processing unit bit length b may be specified by the user from the terminal 2 to the secret information management system 1, or may be a value predetermined by the secret information management system 1. Note that the processing unit bit length b can be an arbitrary number of bits but here it is assumed to be 8 bits by which the original data S is divisible. Consequently, when the above described original data S "10110010 00110111" in 16 bits is divided by the processing unit bit length of 8 bits, the resulting two original partial data S(1) and S(2) are given by "10110010" and "00110111".

Next, at the step S207, whether the bit length of the original data S is an integer multiple of 8×2 or not is judged, and if it is not an integer multiple, the tail of the original data S is filled up by 0 to make it an integer multiple of 8×2. Note that the division processing in the case where the processing unit bit length b is set to be 8 bits and the number of division n is set to be 3 as in this example is valid not only for the original data S with the bit length of 16 bits, but also the original data S with the bit length which is an integer multiple of the processing unit bit length b×(number of division n−1)=8×2.

Next, at the step S209, a variable m which indicates an integer multiple mentioned above is set to 0. Note that m is equal to 0 in the case where the original data S has the bit length equal to the processing unit bit length b×(number of division n−1)=8×2=16 bits as in this example, but m is equal to 1 in the case of 32 bits which is twice as long, and m is equal to 2 in the case of 48 bits which is three times as long.

Next, whether 8×2 bits of data from the 8×2×m+1-th bit of the original data S exist or not is judged (step S211). This judges whether the next 16 bits exists in the original data S after the division processing starting from the step S211 is carried out for the processing unit bit length b×(number of division−1)=8×2=16 bits of the original data S specified by the variable m or not. In the case where the original data S is 16 bits as in this example, when the division processing starting from the step S211 is carried out once for the original data S in 16 bits, the variable m is incremented by 1 at the step S219 to be described below, but data starting from the 17-th bit that correspond to the case of the variable m=1 do not exist in the original data S of this example, so that the processing proceeds from the step S211 to the step S221, but currently the variable m is 0 so that the 8×2×m+1-th bit of the original data S is 8×2×0+1=1 and 8×2 bits of data from the first bit exists in the original data S in 16 bits, and therefore the processing proceeds to the step S213.

At the step S213, the 8 bits (=the processing unit bit length) of data from the 8×(2×m+j−1)+1-th bit of the original data S is set as the original partial data S(2×m+j) while changing the variable j from 1 to 2 (=number of division n−1), such that two (=number of division n−1) sets of the original partial data S(1) and S(2) resulting from the division of the original data S by the processing unit bit length are generated as follows.

Original data $S = S(1), S(2)$

First original partial data $S(1) =$ "10110010"

Second original partial data $S(2) =$ "00110111"

Next, the random number with a length equal to 8 bits generated from the random number generation unit 15 is set as a random number partial data R(2×m+j) while changing the variable j from 1 to 2 (=number of division n−1), such that two (=number of division n−1) sets of the random number partial data R(1) and R(2) resulting from the division of the random number R by the processing unit bit length are generated as follows (step S215).

Random number $R = R(1), R(2)$

First random number partial data $R(1) =$ "10110001"

Second random number partial data $R(2) =$ "00110101"

Next, at the step S217, each divided partial data D(i,2×m+j) that constitutes each one of the plurality of the divided data D(i) is generated according to the definition formula for generating the divided data as shown in the step S217 which is defined by the exclusive OR of the original partial data and the random number partial data, while changing the variable i from 1 to 3 (=number of division n) and changing the variable j from 1 to 2 (=number of division n−1) for each variable i. As a result, the following divided data D are generated.

$$\begin{aligned}
\text{Divided data } D &= \text{three divided data } D(i) \\
&= D(1), D(2), D(3) \\
\text{First divided data } D(1) &= \text{two divided partial data } D(1, j) \\
&= D(1, 1), D(1, 2) \\
&= \text{"00110110", "10110011"} \\
\text{Second divided data } D(2) &= \text{two divided partial data } D(2, j) \\
&= D(2, 1), D(2, 2) \\
&= \text{"00000011", "00000010"} \\
\text{Third divided data } D(3) &= \text{two divided partial data } D(3, j) \\
&= D(3, 1), D(3, 2) \\
&= \text{"10110001", "00110101"}
\end{aligned}$$

Note that the definition formula for generating each divided partial data D(i,j) shown in the step S217 becomes the specific form described in the table shown in FIG. 8 in the case where the number of division n=3 as in this example. From the table shown in FIG. 8, it can be seen that the definition formula for generating the divided partial data D(1, 1) is S(1)*R(1)*R(2), the definition formula for generating the divided partial data D(1,2) is S(2)*R(1)*R(2), the definition formula for generating the divided partial data D(2,1) is S(1)*R(1), the definition formula for generating the divided partial data D(2,2) is S(2)*R(2), the definition formula for generating the divided partial data D(3,1) is R(1), and the definition formula for generating the divided partial data D(3, 2) is R(2). The table shown in FIG. 8 also shows a general definition formula in the case where m>0 is an arbitrary integer.

After generating the divided data D in this way for the case where the variable m=0 which indicates the integer multiple, the variable m is incremented by 1 (step S219), and the processing returns to the step S211, where the similar division processing for data starting from the 17-th bit of the original data S corresponding to the variable m=1 is attempted, but in this example the original data S is 16 bits and data starting from the 17-th bit do not exist, so that the processing proceeds from the step S211 to the step S221, where the divided data D(1), D(2) and D(3) generated as described above are stored into the deposit servers 3 and the terminal 2 respectively, and then the division processing is finished. Note that these deposited divided data D(1), D(2) and D(3) are such that the original data cannot be guessed from any one of them alone.

Now, the divided data generation processing using the definition formula shown in the step S217 of FIG. 6 described above, or more specifically the divided data generation processing in the case where the number of division n=3, will be described.

First, in the case where the variable m=0 that indicates the integer multiple, from the definition formula shown in the step S217, the divided partial data D(i,2×m+j)=D(i,j) (i=1 to 3, j=1 to 2) that constitute each one of the divided data D(i)=D(1) to D(3) are as follows.

$$D(1,1)=S(1)*Q(1,1,1)*Q(1,1,2)$$

$$D(1,2)=S(2)*Q(2,1,1)*Q(2,1,2)$$

$$D(2,1)=S(1)*Q(1,2,1)*Q(1,2,2)$$

$$D(2,2)=S(2)*Q(2,2,1)*Q(2,2,2)$$

$$D(3,1)=R(1)$$

$$D(3,2)=R(2)$$

Q(j,i,k) that is contained in four equations among the above described six equations is given as follows. Namely, when c(j,i,k) is a value of the i-th row and the k-th column of 2×2 matrix $U[2,2] \times (P[2,2]^{(j-1)})$, Q(j,i,k) is given by:

$$Q(j,i,k)=R(k) \text{ when } c(j,i,k)=1$$

$$Q(j,i,k)=0 \text{ when } c(j,i,k)=1$$

Thus, when j=1, $$U[2,2] \times (P[2,2])^{(j-1)} = U[2,2] \times (P[2,2])^0$$
$$= U[2,2] \times E[2,2]$$
$$= U[2,2]$$
$$= \begin{pmatrix} 1 & 1 \\ 1 & 0 \end{pmatrix}$$

and when j=2, $$U[2,2] \times (P[2,2])^{(j-1)} = U[2,2] \times (P[2,2])^1$$
$$= U[2,2] \times P[2,2]$$
$$= \begin{pmatrix} 1 & 1 \\ 1 & 0 \end{pmatrix} \times \begin{pmatrix} 0 & 1 \\ 1 & 0 \end{pmatrix}$$
$$= \begin{pmatrix} 1 & 1 \\ 0 & 1 \end{pmatrix}$$

Using these, each divided partial data D(i,j) is generated by the following definition formula.

$$D(1,1) = S(1)*Q(1,1,1)*Q(1,1,2) = S(1)*R(1)*R(2)$$

$$D(1,2) = S(2)*Q(2,1,1)*Q(2,1,2) = S(2)*R(1)*R(2)$$

$$D(2,1) = S(1)*Q(1,2,1)*Q(1,2,2)$$
$$= S(1)*R(1)*0$$
$$= S(1)*R(1)$$

$$D(2,2) = S(2)*Q(2,2,1)*Q(2,2,2)$$
$$= S(2)*0*R(2)$$
$$= S(2)*R(2)$$

Figure 7:
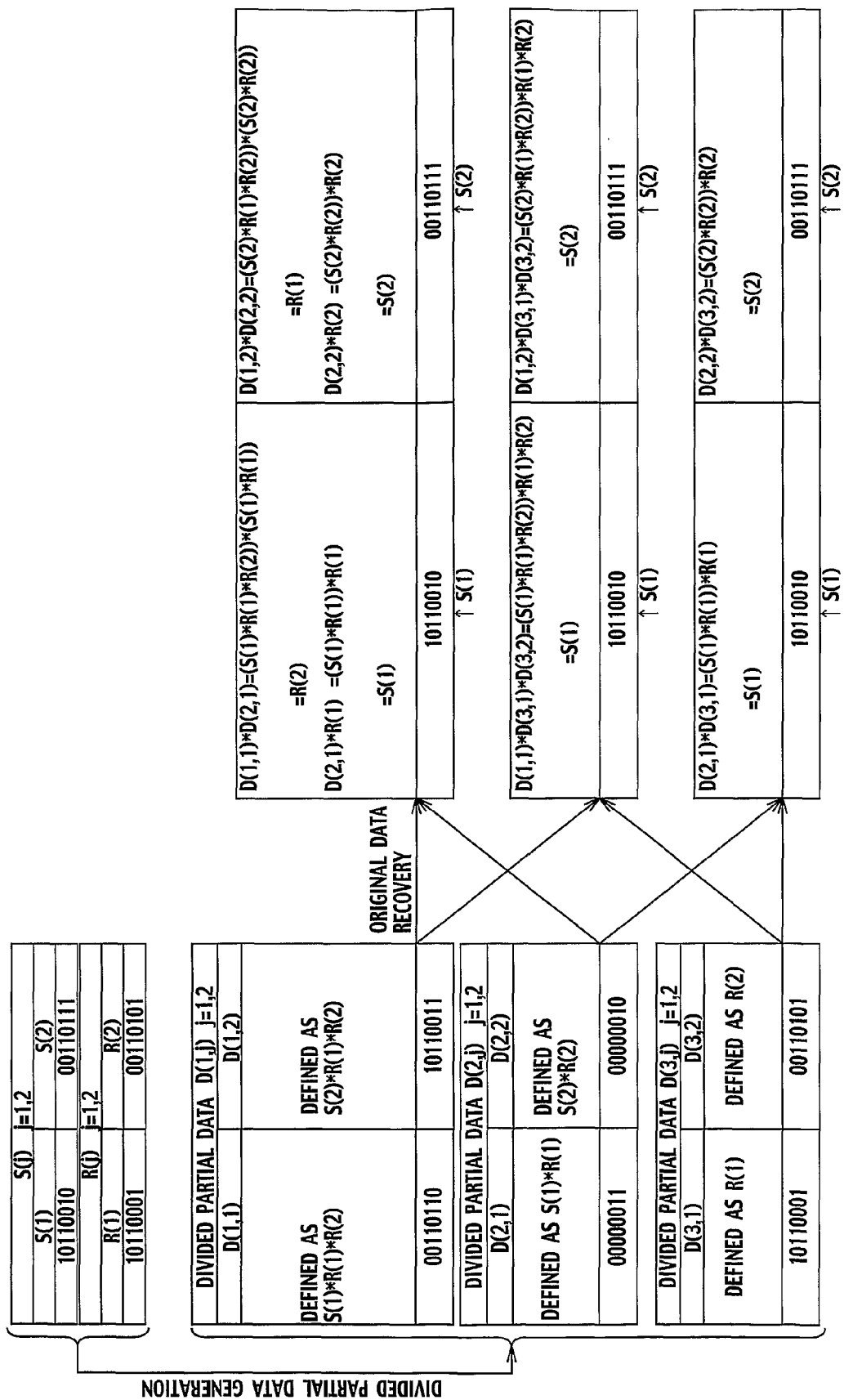
FIG. 7 is a diagram showing outline of a division processing and a recovery processing in the case of division into three according to the second embodiment of the present invention.

The above described definition formula for generating each divided partial data D(i,j) is also shown in FIG. 7.

FIG. 7 is a table that shows each data and the definition formula in the case dividing the original data S in 16 bits into three (the number of division n=3) by using the processing unit bit length equal to 8 bits as described above, and the calculation formula in the case of recovering the original data S from the divided partial data.

Now, the process and the general form of the definition formula for generating the divided data D(1), D(2) and D(3) and the divided partial data D(1,1), D(1,2), D(2,1), D(2,2), D(3,1) and D(3,2) will be described.

First, for the first divided data D(1), the first divided partial data D(1,1) is defined by the above described formula S(1)*R(1)*R(2), and the second divided partial data D(1,2) is defined by the above described formula S(2)*R(1)*R(2). Note that the general form is S(j)*R(j)*R(j+1) for D(1,j) and S(j+1)*R(j)*R(j+1) for the D(1,j+1) (where j is assumed to be an odd number). By the calculation according to the definition formula, D(1.1) is "001101100", D(1,2) is "10110011", so that D(1) is "00110110 10110011". Note that the general form of the definition formula is shown in FIG. 8.

Also, for the second divided data D(2), the first divided partial data D(2,1) is defined by the above described formula S(1)*R(1), and the second divided partial data D(2,2) is defined by the above described formula S(2)*R(2). Note that the general form is S(j)*R(j) for D(2,j) and S(j+1)*R(j+1) for the D(2,j+1) (where j is assumed to be an odd number). By the calculation according to the definition formula, D(2.1) is "00000011", D(2,2) is "00000016", so that D(2) is "00000011 00000010".

Also, for the third divided data D(3), the first divided partial data D(3,1) is defined by the above described formula R(1), and the second divided partial data D(3,2) is defined by the above described formula R(2). Note that the general form is R(j) for D(3,j) and R(j+1) for the D(3,j+1) (where j is assumed to be an odd number). By the calculation according to the definition formula, D(3.1) is "10110001" and D(3,2) is "00110101", so that D(3) is "10110001 00110101".

Note that, in the above description, the bit length of S, R, D(1), D(2) and D(3) is assumed to be 16 bits, but it is possible to generate the divided data D(1), D(2) and D(3) from the original data S of any bit length by repeating the above described division processing from the top of the data. Also, the processing unit bit length b can be arbitrary, and it is applicable to the original data S of arbitrary bit length by repeating the above described division processing for each length of b×2 sequentially from the top of the original data S, or more specifically to the original data S with a bit length which is an integer multiple of the processing unit bit length b×2. Note that if the bit length of the original data S is not an integer multiple of the processing unit bit length b×2, it is still possible to apply the division processing of this embodiment as described above by adjusting the bit length of the original data S to be an integer multiple of the processing unit bit length b×2 by filling up the tail of the original data S by 0, for example.

Next, with reference to a table shown on a right side of FIG. 7, the processing for recovering the original data from the divided data will be described. This is the description of the function of the original data recovery unit 12 of the secret information management system 1.

First, the recovery of the original data S is requested to the secret information management system 1. Then, the secret information management system 1 acquires the divided data D(1), D(2) and D(3) from the deposit servers 3 and the terminal 2, and recovers the original data S from the acquired divided data D(1), D(2) and D(3) as follows.

First, the first original partial data S(1) can be generated from the divided partial data D(2,1) and D(3,1) as follows.

$$D(2,1) * D(3,1) = (S(1) * R(1)) * R(1)$$
$$= S(1) * (R(1) * R(1))$$
$$= S(1) * 0$$
$$= S(1)$$

More specifically, D(2,1) is "00000011" and D(3,1) is "10110001" so that S(1) becomes "10110010".

Also, the second original partial data S(2) can be generated from the other divided partial data as follows.

$$D(2,2) * D(3,2) = (S(2) * R(2)) * R(2)$$
$$= S(2) * (R(2) * R(2))$$
$$= S(2) * 0$$
$$= S(2)$$

More specifically, D(2,2) is "00000010" and D(3,2) is "00110101" so that S(2) becomes "00110111".

In general, when j is an odd number, the relationship of:

$$D(2,j) * D(3,j) = (S(j) * R(j)) * R(j)$$
$$= S(j) * (R(j) * R(j))$$
$$= S(j) * 0$$
$$= S(j)$$

holds, so that S(J) can be obtained by calculating D(2,j)*D(3,j).

Also, in general, when j is an odd number, the relationship of:

$$D(2,j+1) * D(3,j+1) = (S(j+1) * R(j+1)) * R(j+1)$$
$$= S(j+1) * (R(j+1) * R(j+1))$$
$$= S(j+1) * 0$$
$$= S(j+1)$$

holds, so that S(j+1) can be obtained by calculating D(2,j+1)*D(3,j+1).

Next, the case of recovering the original data S by acquiring D(1) and D(3) is as follows. Namely, the relationship of:

$$D(1,1) * D(3,1) * D(3,2) = (S(1) * R(1) * R(2)) * R(1) * R(2)$$
$$= S(1) * (R(1) * R(1)) * (R(2) * R(2))$$
$$= S(1) * 0 * 0$$
$$= S(1)$$

holds, so that S(1) can be obtained by calculating D(1,1)*D(3,1)*D(3,2). More specifically, D(1,1) is "00110110", D(3,1) is "10110001" and D(3,2) is "00110101" so that S(1) becomes "10110010".

Similarly, the relationship of:

$$D(1,2) * D(3,1) * D(3,2) = (S(2) * R(1) * R(2)) * R(1) * R(2)$$
$$= S(2) * (R(1) * R(1)) * (R(2) * R(2))$$
$$= S(2) * 0 * 0$$
$$= S(2)$$

holds, so that S(2) can be obtained by calculating D(1,2)*D(3,1)*D(3,2). More specifically, D(1,2) is "10110011", D(3,1) is "10110001" and D(3,2) is "00110101" so that S(2) becomes "00110111".

In general, when j is an odd number, the relationship of:

$$D(1,j) * D(3,j) * D(3,j+1) = (S(j) * R(j) * R(j+1)) * R(j) * R(j+1)$$
$$= S(j) * (R(j) * R(j)) * (R(j+1) * R(j+1))$$
$$= S(j) * 0 * 0$$
$$= S(j)$$

holds, so that S(j) can be obtained by calculating D(1,j)*D(3,j)*D(3,j+1).

Also, in general, when j is an odd number, the relationship of:

$$D(1,j+1) * D(3,j) * D(3,j+1) = (S(j+1) * R(j) * R(j+1)) * R(j) * R(j+1)$$
$$= S(j+1) * (R(j) * R(j)) * (R(j+1) * R(j+1))$$
$$= S(j+1) * 0 * 0$$
$$= S(j+1)$$

holds, so that S(j+1) can be obtained by calculating D(1,j+1)*D(3,j)*D(3,j+1).

Next, the case of recovering the original data S by acquiring the divided data D(1) and D(2) is as follows.

Namely, the relationship of:

$$D(1,1) * D(2,1) = (S(1) * R(1) * R(2)) * (S(1) * R(1))$$
$$= (S(1) * S(1)) * (R(1) * R(1)) * R(2)$$
$$= 0 * 0 * R(2)$$
$$= R(2)$$

holds, so that R(2) can be obtained by calculating D(1,1)*D(2,1). More specifically, D(1,1) is "00110110" and D(2,1) is "00000011" so that R(2) becomes "00110101".

Similarly, the relationship of:

$$D(1,2)*D(2,2) = (S(2)*R(1)*R(2))*(S(2)*R(2))$$
$$= (S(2)*S(2))*R(1)*(R(2)*R(2))$$
$$= 0*R(1)*0$$
$$= R(1)$$

holds, so that R(1) can be obtained by calculating D(1,2)*D(2,2). More specifically, D(1,2) is "10110011", D(2,2) is "00000010" so that R(1) becomes "10110001".

Using these R(1) and R(2), S(1) and S(2) are obtained as follows. Namely, the relationship of:

$$D(2,1)*R(1) = (S(1)*R(1))*R(1)$$
$$= S(1)*(R(1)*R(1))$$
$$= S(1)*0$$
$$= S(1)$$

holds, so that S(1) can be obtained by calculating D(2,1)*R(1). More specifically, D(2,1) is "00000011" and R(1) is "10110001" so that S(1) becomes "10110010".

Similarly, the relationship of:

$$D(2,2)*R(2) = (S(2)*R(2))*R(2)$$
$$= S(2)*(R(2)*R(2))$$
$$= S(2)*0$$
$$= S(2)$$

holds, so that S(2) can be obtained by calculating D(2,2)*R(2). More specifically, D(2,2) is "00000010", R(2) is "00110101" so that S(2) becomes "00110111".

In general, when j is an odd number, the relationship of:

$$D(1,j)*D(2,j) = (S(j)*R(j)*R(j+1))*(S(j)*R(j))$$
$$= (S(j)*S(j))*(R(j)*R(j))*R(j+1)$$
$$= 0*0*R(j+1)$$
$$= R(j+1)$$

holds, so that R(j+1) can be obtained by calculating D(1,j)*D(2,j).

Also, in general, when j is an odd number, the relationship of:

$$D(1,j+1)*D(2,j+1) = (S(j+1)*R(j)*R(j+1))*$$
$$(S(j+1)*R(j+1))$$
$$= (S(j+1)*S(j+1))*R(j)*$$
$$(R(j+1)*R(j+1))$$
$$= 0*R(j)*0$$
$$= R(j)$$

holds, so that R(j) can be obtained by calculating D(1,j+1)*D(2,j+1).

Using these R(j) and R(j+1), S(j) and S(j+1) are obtained as follows. Namely, the relationship of:

$$D(2,j)*R(j) = (S(j)*R(j))*R(j)$$
$$= S(j)*(R(j)*R(j))$$
$$= S(j)*0$$
$$= S(j)$$

holds, so that S(j) can be obtained by calculating D(2,j)*R(j).

Similarly, the relationship of:

$$D(2,j+1)*R(j+1) = (S(j+1)*R(j+1))*R(j+1)$$
$$= S(j+1)*(R(j+1)*R(j+1))$$
$$= S(j+1)*0$$
$$= S(j+1)$$

holds, so that S(j+1) can be obtained by calculating D(2,j+1)*R(j+1).

As described above, when the divided data are generated by repeating the division processing from the top of the original data according to the processing unit bit length b, it is possible to recover the original data by using two divided data among three divided data, without using all of the three divided data D(1), D(2) and D(3).

As another embodiment of the present invention, it is possible to carry out the original data division processing by using the random number R with a bit length shorter than a bit length of the original data S.

Namely, the random number R is assumed to be data with the same bit length as S, D(1), D(2) and D(3) in the above, but the random number R can have a bit length shorter than a bit length of the original data S and this random number R with a shorter bit length can be used repeatedly in the generation of the divided data D(1), D(2) and D(3).

Note that the case where the number of division is three has been described here because the secret information management system 1 generates three divided data D(1), D(2) and D(3) in this embodiment, but the secret sharing scheme A is also applicable to the case where the number of division is n.

Figure 9:
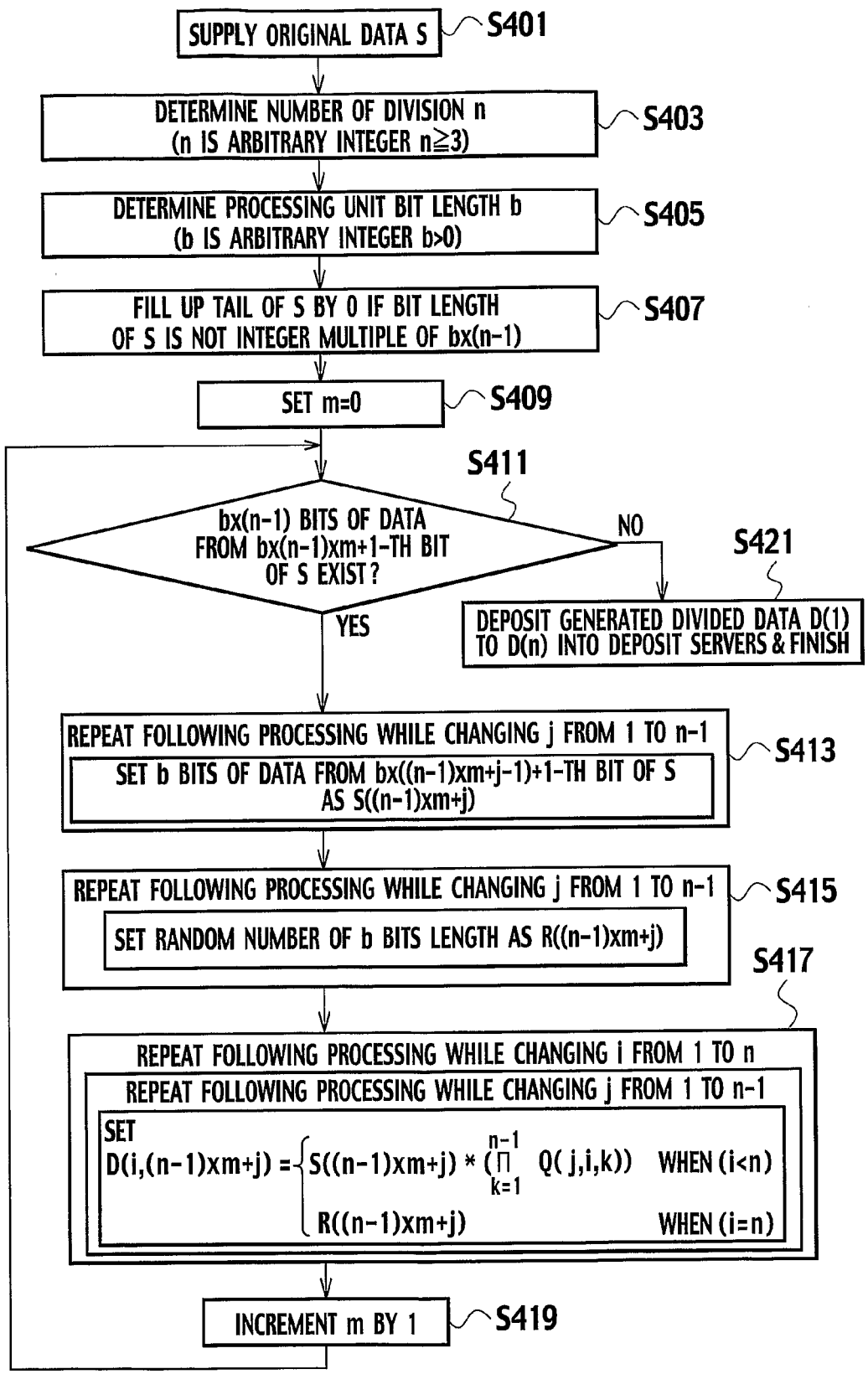
FIG. 9 is a flow chart showing a division processing by the secret information management system shown in FIG. 1, in the case where a number of division is n.

Next, with reference to FIG. 9, the general division processing in the case where the number of division is n and the processing unit bit length is b will be described.

First, the original data S is given to the secret information management system 1 (step S401). Then, the number of division n (arbitrary integer n≧3) is specified to the secret information management system 1 (step S403). Also, the processing unit bit length b is determined (step S405), where n is an arbitrary integer greater than zero. Next, whether the bit length of the original data S is an integer multiple of b×(n−1) or not is judged, and if it is not an integer multiple, the tail of the original data S is filled up by 0 (step S407). Also, a variable m which indicates an integer multiple is set to 0 (step S409).

Next, whether b×(n−1) bits of data from the b×(n−1)×m+1-th bit of the original data S exist or not is judged (step S411). As a result of this judgement, if the data do not exist, the processing will proceed to the step S421, but currently the variable m is set to 0 at the step S409 and the data exist so that the processing proceeds to the step S413.

At the step S413, b bits of data from b×((n−1)×m+j−1)+1-th bit of the original data S is set as the original partial data S((n−1)×m+j) while changing the variable j from 1 to n−1, such that (n−1) sets of the original partial data S(1), S(2), . . . , S(n−1) resulting from the division of the original data S by the processing unit bit length b are generated.

Next, the random number with a length equal to the processing unit bit length b generated by the random number generation unit 15 is set as the random number partial data R((n−1)×m+j) while changing the variable j from 1 to n−1, such that (n−1) sets of the random number partial data R(1), R(2), . . . , R(n−1) resulting from the division of the random number R by the processing unit bit length b are generated (step S415).

Next, at the step S417, each divided partial data D(i,(n−1)×m+j) that constitutes each one of the plurality of the divided data D(i) is generated according to the definition formula for generating the divided data as shown in the step S417, while changing the variable i from 1 to n and changing the variable j from 1 to n−1 for each variable i. As a result, the following divided data D are generated.

Divided data $D = n$ sets of divided data $D(i) = D(1), D(2), \ldots, D(n)$

First divided data $D(1) = n-1$ sets of divided partial data $D(1, j)$
$= D(1, 1), D(1, 2), \ldots, D(1, n-1)$ Second divided data $D(2) = n-1$ sets of divided partial data $D(2, j)$
$= D(2, 1), D(2, 2), \ldots, D(2, n-1)$

... ... ...

n-th divided data $D(n) = n-1$ sets of divided partial data $D(3, j)$
$= D(n, 1), D(n, 2), \ldots, D(n, n-1)$ After generating the divided data D in this way for the case where the variable m=0, the variable m is incremented by 1 (step S419), and the processing returns to the step S411, where the similar division processing for data starting from the b×(n−1)-th bit of the original data S corresponding to the variable m=1 is carried out. Finally, when all the data of the original data are processed as a result of the judgement at the step S411, the processing proceeds from the step S411 to the step S421, where the divided data D(1) to D(n) generated as described above are stored into the deposit servers 3 and the terminal 2, and then the division processing is finished.

Now, in the amendments described above, there can be cases where the random number components can be eliminated by carrying out the calculation among the divided partial data that constitute one and the same divided data. Namely, in the case of the division into three, for example, the divided partial data are as shown in FIG. 8, which are defined as follows.

$D(1,1)=S(1)*R(1)*R(2), D(1,2)=S(2)*R(1)*R(2),$ $D(2,1)=S(1)*R(1), D(2,2)=S(2)*R(2),$ $D(3,1)=R(1), D(3,2)=R(2),$

For D(1), if D(1,1) and D(1,2) are acquired, for example, it follows that:

$$\begin{aligned}D(1, 1)*D(1, 2) &= (S(1)*R(1)*R(2))*(S(2)*R(1)*R(2))\\&= S(1)*S(2)*(R(1)*R(1))*(R(2)*R(2))\\&= S(1)*S(2)*0*0\\&= S(1)*S(2)\end{aligned}$$

In general, D(1,j)*D(1,j+1)=S(j)*S(j+1), where j=2×m+1 and m≧0 is an arbitrary integer.

As can be seen from the above described definition, D(1,1) and D(1,2) are generated by the calculation on the original data and the random number, and the content of the original data cannot be ascertained from each one of D(1,1) and D(1,2) alone, but by carrying out the calculation of D(1,1)*D(1,2), it is possible to obtain S(1)*S(2). This is not the same as the original data itself, but it contains no random number component.

When the random number component is eliminated, the following problem arises. Namely, regarding the individual original partial data, if a part of S(2) becomes known, for example, it would become possible to recover a part of S(1) so that it can be considered as not safe. For example, when the original data is data according to a standard data format, and S(2) is a portion containing the header information in that data format or the padding (a part of a data region filled up by 0, for example), etc., this portion may contain keywords or fixed character strings specific to this data format, so that it may become possible to conjecture its content. Also, a part of S(1) may be recovered from the known portion of S(2) and a value of S(1)*S(2).

One possible way of solving the above described problem is as follows.

Figure 10:
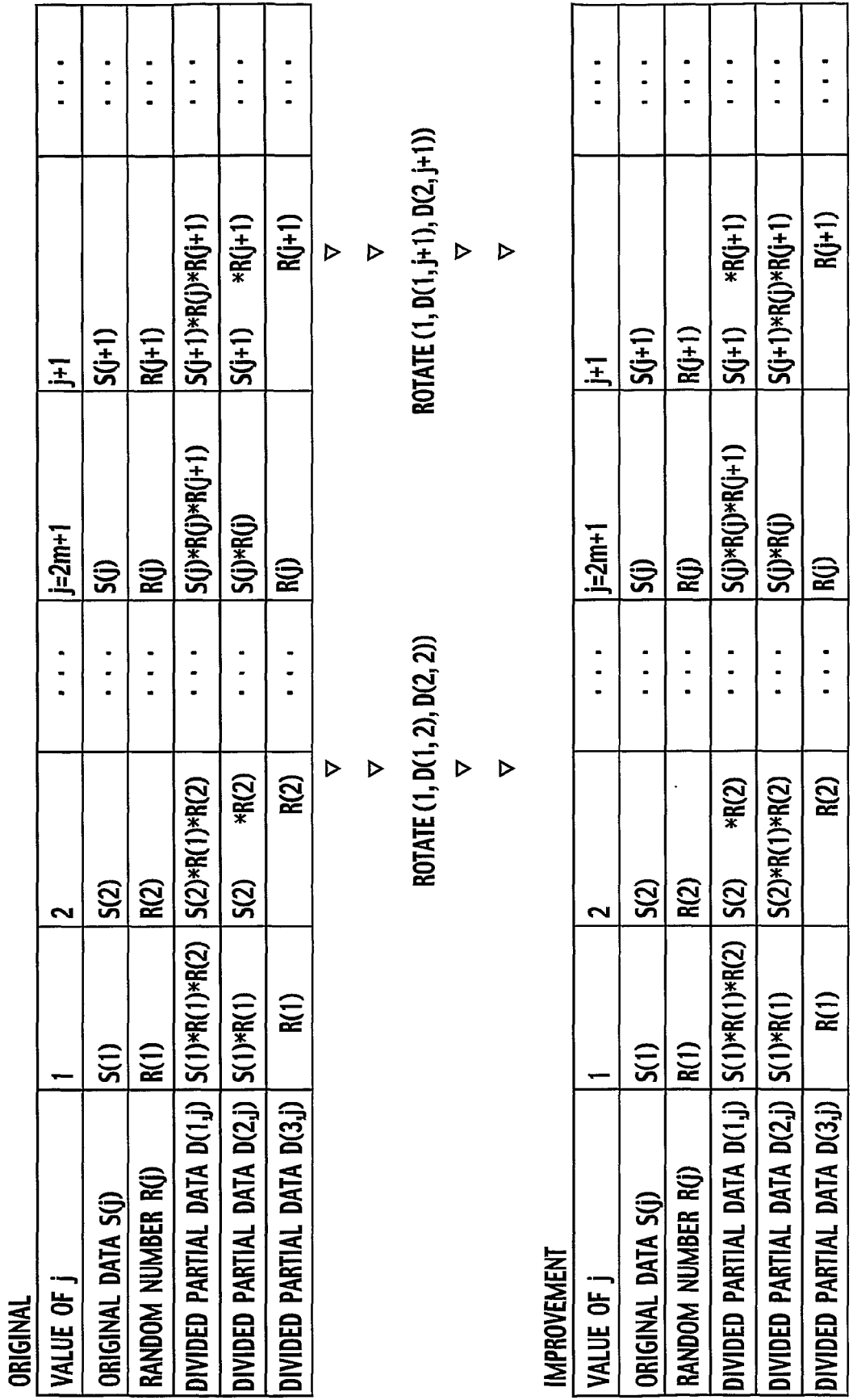
FIG. 10 is a table showing an example of divided partial data and their definition formula in original and improved forms in the case of division into three according to the second embodiment of the present invention.

FIG. 10 shows the divided partial data in the case of the number of division n=3 in the original form obtained as described above and an improved form obtained by this procedure. As shown in FIG. 10, in this procedure, D(1,j+1) and D(2,j+1) as shown in FIG. 8 are interchanged (rotated once), where j=2×m+1 and m≧0 is an arbitrary integer.

In this case, the random number components cannot be eliminated even when the calculation among the divided partial data that constitute one and the same divided data is carried out, as follows. It can be seen from FIG. 10 that:

$$\begin{aligned}D(1, j)*D(1, j+1) &= (S(j)*R(j)*R(j+1))*(S(j+1)*R(j+1))\\&= S(j)*S(j+1)*R(j)*(R(j+1)*R(j+1))\\&= S(j)*S(j+1)*R(j)*0\\&= S(j)*S(j+1)*R(j)\end{aligned}$$

$$\begin{aligned}D(2, j)*D(2, j+1) &= (S(j)*R(j))*(S(j+1)*R(j)*R(j+1))\\&= S(j)*S(j+1)*(R(j)*R(j))*R(j+1)\\&= S(j)*S(j+1)*0*R(j+1)\\&= S(j)*S(j+1)*R(j+1)\end{aligned}$$

$D(3, j)*D(3, j+1) = R(j)*R(j+1)$

Also, in this case, the property that the original data can be recovered from two divided data among the three divided data is still intact as follows.

In the case of recovering the original data by acquiring D(1) and D(2), it should be apparent that the original data can be recovered because D(1) and D(2) of FIG. 10 are obtained by simply interchanging the divided partial data that constitute D(1) and D(2) of FIG. 8.

In the case of recovering the original data by acquiring D(1) and D(3), or D(2) and D(3), because D(3) is the divided data that comprise only the random numbers, it is possible to recover the original data by eliminating the random number portion by carrying out the exclusive OR calculation with as many random numbers as necessary for each divided partial data of D(1) or D(2).

Figure 20:
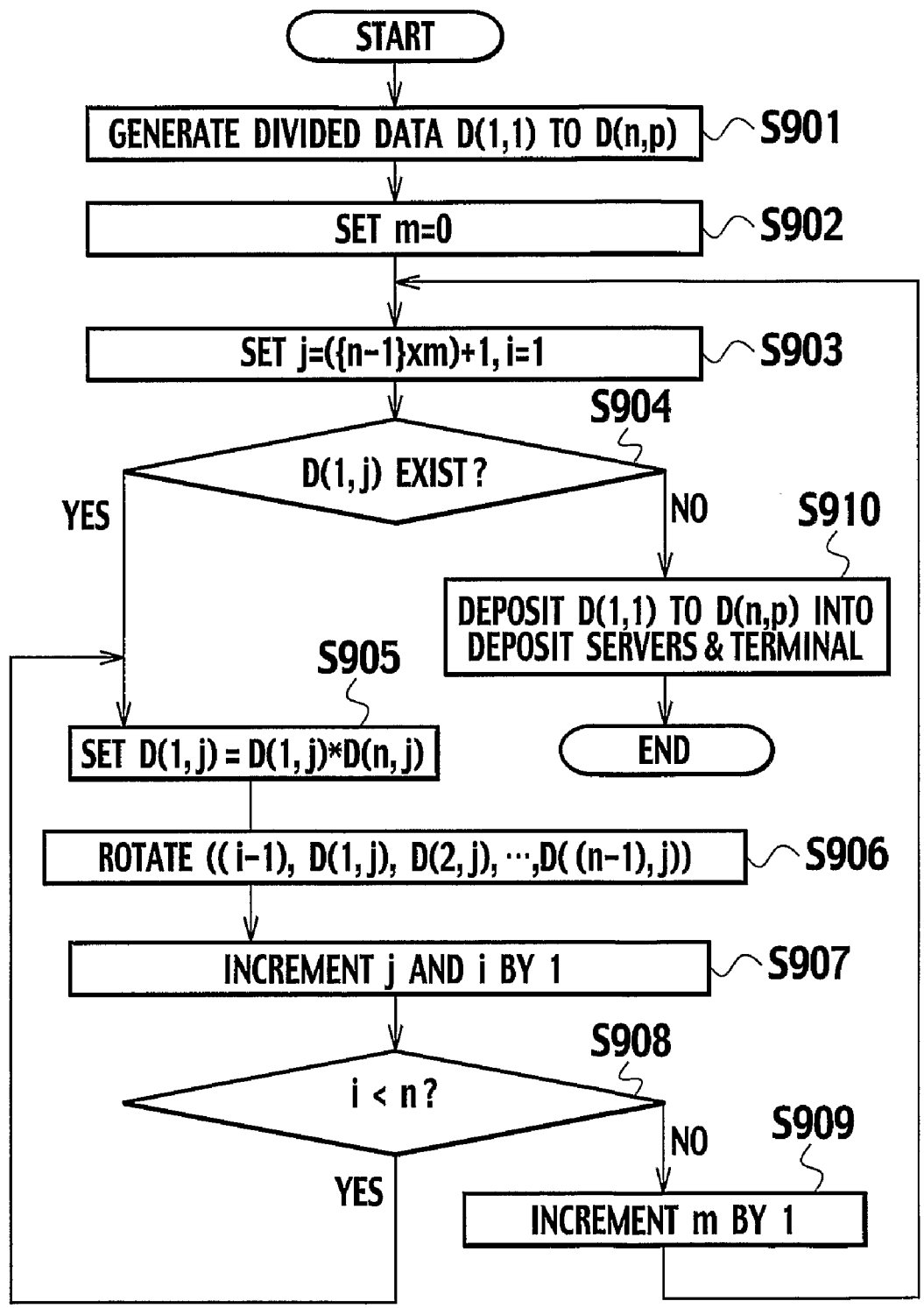
FIG. 20 is a flow chart showing a generalized processing for improving the divided partial data according to the second embodiment of the present invention.
Figure 24:
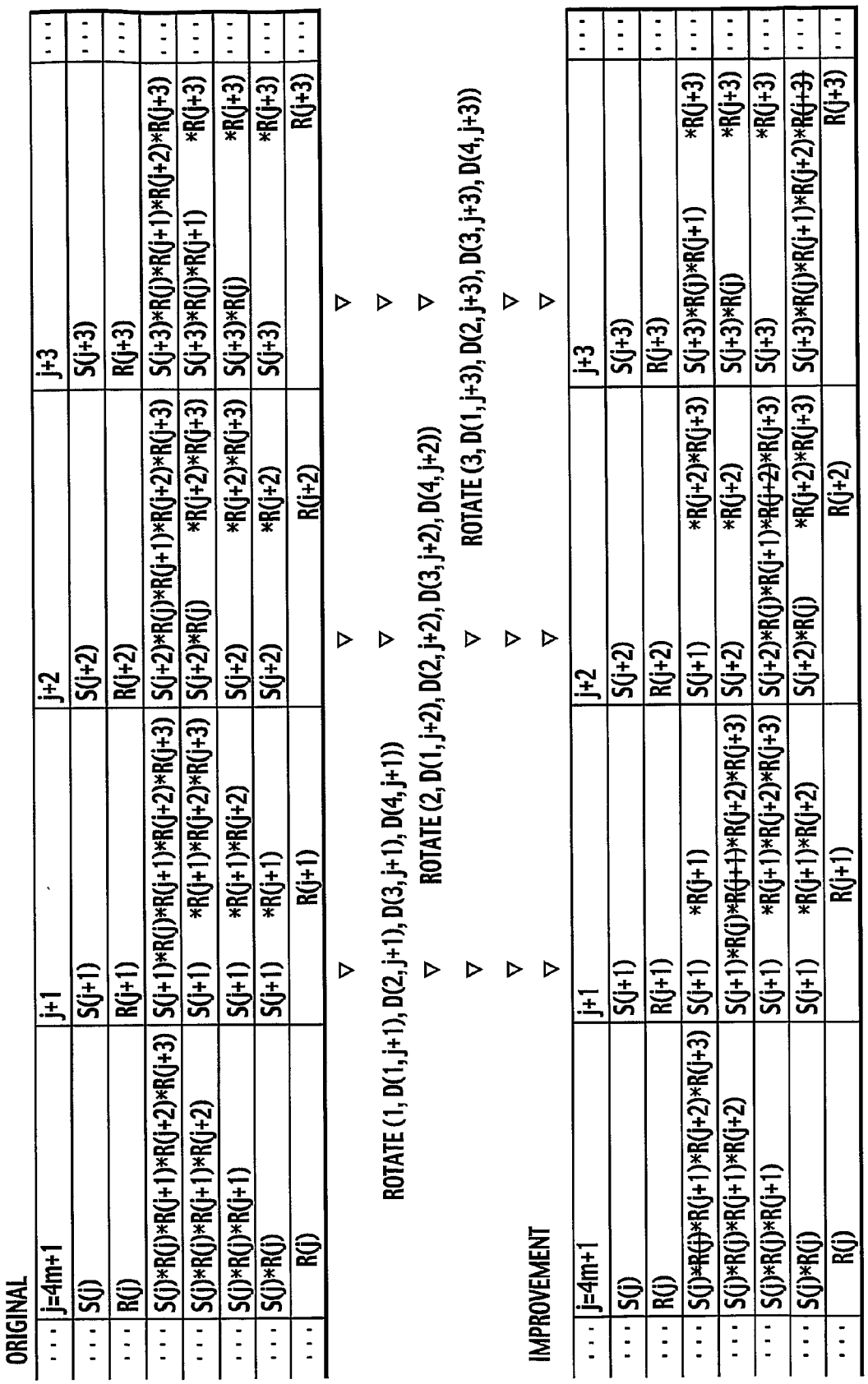

On the other hand, in the case of the number of division $n \geq 4$, the generalized procedure shown in FIG. 20 can be used. FIGS. 21 and 22 show the divided data in the case of the number of division n=4 in the original form obtained as described above and an improved form obtained by this procedure, and FIGS. 23 and 24 show the divided data in the case of the number of division n=5 in the original form as described above and an improved form obtained by this procedure.

In the procedure of FIG. 20, first, the divided data D(1,1) to D(n,p) are generated straightforwardly by using the secret sharing scheme A described above, where D(n,p) is the tail of the data (step S901). Then, a variable m which indicates an integer multiple is set to 0 (step S902), and the variable j is set to be $j=((n-1) \times m)+1$ while the variable i is set to be i=1 (step S903).

Next, for the value of j set at the step S903, if the divided data (D1,j) exists (step S904 YES), the divided data D(i,j) is set to be D(1,j)=D(1,j)*D(n,j) (step S905). As can be seen from FIGS. 21 to 24, D(n,j) is R(j), so that the step S905 effectively eliminates R(j) component from D(1,j). Then, the divided data D(1,j), D(2,j), . . . D((n-1),j) are rotated (i-1) times (step S906). This operation is denoted as Rotate((i-1), D(1,j), D(2,j), . . . D((n-1),j)) in FIG. 20.

Here, the rotation is such an operation that D(i,j) is sequentially shifted to the place of D(i+1,j) and D(n-1,j) is shifted to the place of D(i,j) by one rotation. For example, in FIG. 21, D(1,1), D(2,1) and D(3,1) are rotated $(1-(4-1) \times 0-1)=0$ times (unchanged), while D(1,2), D(2,2) and D(3,2) are rotated $(2-(4-1) \times 0-1)=1$ time so that D(1,2) is shifted to the place of D(2,2), D(2,2) is shifted to the place of F(3,2) and D(3,2) is shifted to the place of D(1,2), and D(1,3), D(2,3) and D(3,3) are rotated $(3-(4-1) \times 0-1)=2$ times so that D(1,3) is shifted to the place of D(3,3), D(2,3) is shifted to the place of D(1,3) and D(3,3) is shifted to the place of D(2,3), and so on.

In other words, the operations of the steps S905 and S908 are equivalent to rotating D(1,j), D(2,j), . . . D(n-1,j) for $(j-(n-1) \times m-1)$ times and then taking the exclusive OR of D(1,j) and R(j), D(2,j+1) and R(j+1), . . . D(n-1,j+n-1) and R(j+n-1) for all values of m.

Then, the variables j and i are incremented by one (step S907), and as long as the variable i is less than the number of division n (step S908 YES), the processing returns to the step S905, and the steps S905 to S907 are repeated for the next value of j, until i becomes equal to n (step S908 NO).

When i becomes equal to n, the variable m is incremented by one (step S909), and the processing returns to the step S903 such that the steps S903 to S908 are repeated for the next value of $j=((n-1) \times m)+1$.

When the steps S903 to S909 are carried out for all D(i,j) (step S904 NO), the resulting divided data D(1,1) to D(n,p) are deposited into the deposit servers and the terminal and the processing is finished (step S910).

It is to be noted that the operation at the step S906 of Rotate((i-1), D(1,j), D(2,j), D((n-1),j)) in FIG. 20 can be generalized to the operation which rotates the different columns for different times among the columns that belong to the same value of m in a table of the divided partial data such as those shown in FIG. 21 to FIG. 24

Next, the re-division processing for generating new divided data (re-divided data) by further giving the random number to the divided data that are already divided once will be described. This is the description of the function of the re-divided data generation unit 16 of the secret information management system 1 in the case where the user lost the user's own divided data, and here again the exemplary case where the number of division is three will be described. The re-division processing in this embodiment can be realized by the following two methods.

(Random Number Additional Incorporation Scheme)

Figure 11:
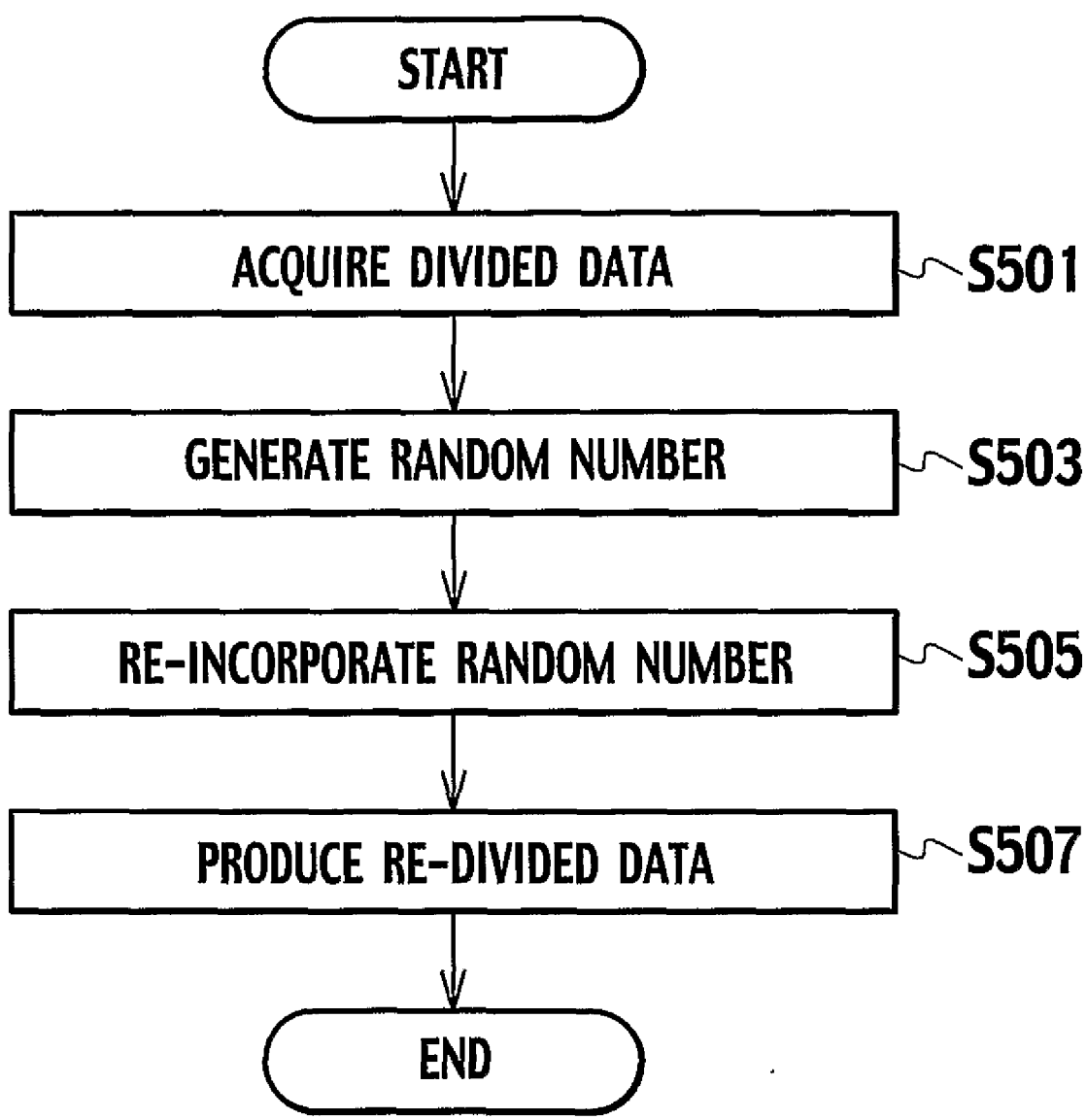
FIG. 11 is a flow chart showing a data re-division processing based on a random number additional incorporation scheme by the secret information management system shown in FIG. 1.

FIG. 11 shows an outline of the data re-division processing in the random number additional incorporation scheme.

As shown in FIG. 11, the divided data D(1), D(2) and D(3) are acquired first (step S501), and then the random number R' to be used at a time of the re-division is generated at the random number generation unit 15 (step S503).

Next, the random number R' is incorporated into each one of the divided data D(1), D(2) and D(3) according to a prescribed rule (step S505). This is done by taking the exclusive OR of the divided partial data of the divided data D(1), D(2) and D(3) and the random number partial data of the random number R' according to the rule to be described below, and then the new divided data D'(1), D'(2) and D'(3) are generated (step S507).

Figure 12:
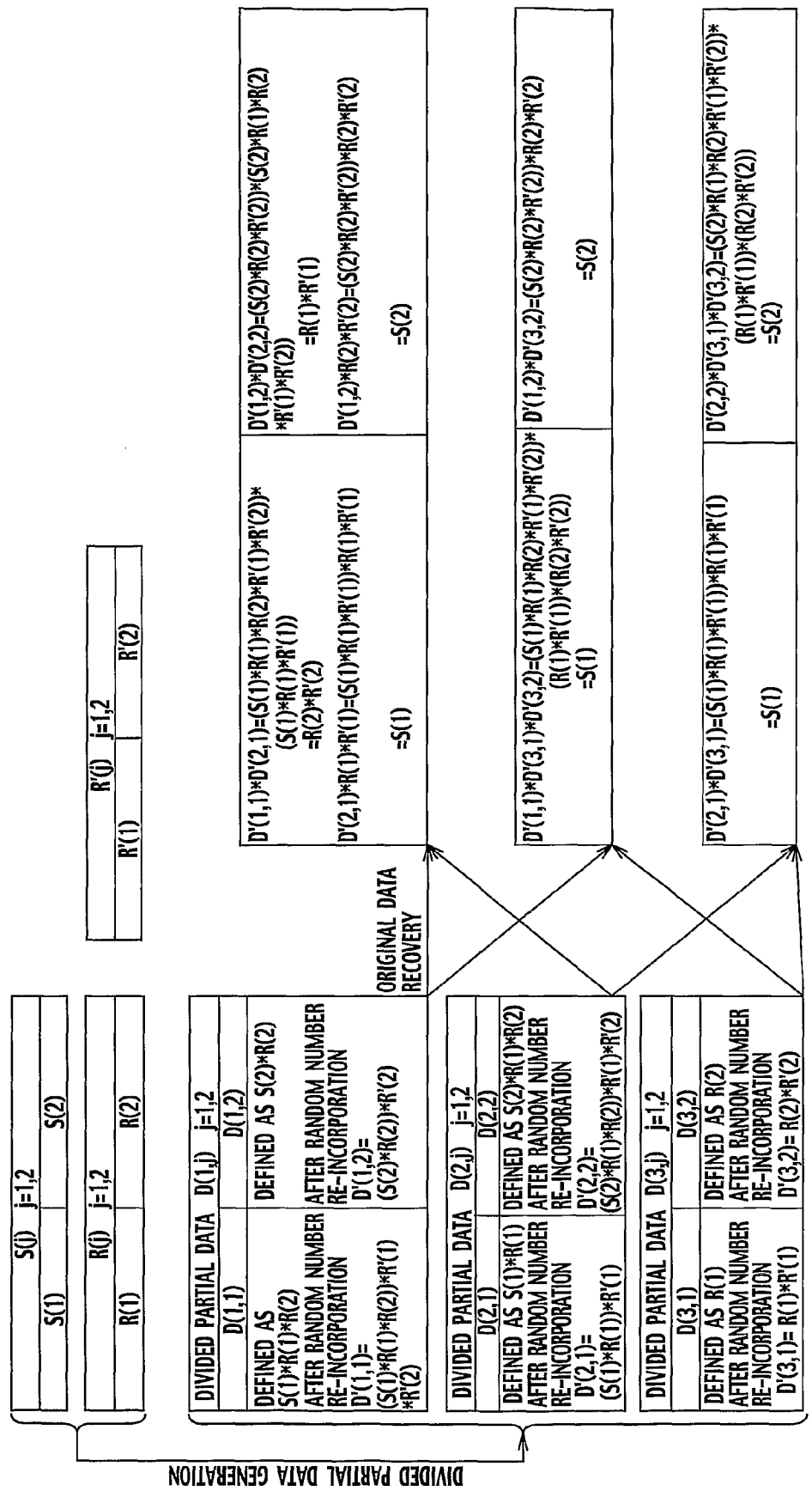
FIG. 12 is a table showing an example of divided partial data and their definition formula in the case of division into three by the random number additional incorporation scheme according to the second embodiment of the present invention.

FIG. 12 is a table that shows the definition formula for the divided partial data in the case dividing the original data S into three (the number of division n=3) by using the processing unit bit length b which is a half of the length of the original data S, the definition formula of the divided partial data after the re-incorporation of the random number, and the calculation formula in the case of recovering the original data S from the divided partial data.

Here, the definition formula of the divided partial data D(i,j) will be described.

First, for the first divided data D(1), as shown in FIG. 10, the first divided partial data D(1,1) is defined by the definition formula S(1)*R(1)*R(2), and the second divided partial data D(1,2) is defined by the definition formula S(2)*R(2). Note that the general form of the definition formula is S(j)*R(j)*R(j+1) for D(1,j) and S(j+1)*R(j+1) for the D(1,j+1) (where j is assumed to be an odd number).

Also, for the second divided data D(2), as shown in FIG. 10, the first divided partial data D(2,1) is defined by the definition formula S(1)*R(1), and the second divided partial data D(2,2) is defined by the definition formula S(2)*R(1)*R(2). Note that the general form of the definition formula is S(j)*R(j) for D(2,j) and S(j+1)*R(j)*R(j+1) for the D(2,j+1) (where j is assumed to be an odd number).

Also, for the third divided data D(3), as shown in FIG. 10, the first divided partial data D(3,1) is defined by the definition formula R(1), and the second divided partial data D(3,2) is defined by the definition formula R(2). Note that the general form of the definition formula is R(j) for D(3,j) and R(j+1) for the D(3,j+1) (where j is assumed to be an odd number).

Next, the definition formula for the divided partial data D'(i,j) after the incorporation of the new random number R' will be described.

First, for the first divided data D'(1), as shown in FIG. 12, the first divided partial data D'(1,1) is defined by the definition formula D(1,1)*R'(1)*R'(2), i.e., S(1)*R(1)*R(2)*R'(1)*R'(2), and the second divided partial data D'(1,2) is defined by the definition formula D'(1,2)*R'(2), i.e., S(2)*R(2)*R'(2). Note that the general form of the definition formula is D(i,j)

*R'(j)*R'(j+1) for D'(1,j) and D(1,j+1)*R'(j+1) for the D'(1, j+1) (where j is assumed to be an odd number).

Also, for the second divided data D'(2), as shown in FIG. 12, the first divided partial data D'(2,1) is defined by the definition formula D(2,1)*R'(1), i.e., S(1)*R(1)*R'(1), and the second divided partial data D'(2,2) is defined by the definition formula D(2,2)*R'(1)*R'(2), i.e., S(2)*R(1)*R(2)*R'(1)*R'(2). Note that the general form of the definition formula is D(2,j)*R'(j) for D'(2,j) and D(2,j+1)*R'(j)*R'(j+1) for the D'(2,j+1) (where j is assumed to be an odd number).

Also, for the third divided data D'(3), as shown in FIG. 12, the first divided partial data D'(3,1) is defined by the definition formula D(3,1)*R'(1), i.e., R(1)*R'(1), and the second divided partial data D'(3,2) is defined by the definition formula D(3,2)*R'(2), i.e., R(2)*R'(2). Note that the general form of the definition formula is D(3,j)*R'(j) for D'(3,j) and D(3,j+1)*R'(j+1) for the D'(3,j+1) (where j is assumed to be an odd number).

As such, the re-divided partial data D'(i,j) is obtained by calculating the exclusive OR by incorporating the random number partial data R'(j) corresponding to the random number partial data R(j) that was incorporated by the definition formula of the divided partial data D(i,j), into the divided partial data D(i,j). This is valid for any number of division.

Note that, in the case where the user lost the user's own divided data, one of the above described divided data D(1), D(2) and D(3) is lost, so that there is a need to recover the lost divided data from the remaining two divided data and then generate the re-divided data. Here, the method for generating the lost divided data from the remaining two divided data will be described.

First, the case in which the divided data D(3) is lost and the divided data D(3) is to be generated from the divided data D(1) and D(2) will be described. More specifically, in an example of FIG. 12, the relationships of:

$$D(1,1)*D(2,1) = (S(1)*R(1)*R(2))*(S(1)*R(1))$$
$$= R(2)*(S(1)*S(1))*(R(1)*R(1))$$
$$= R(2)$$

$$D(1,2)*D(2,2) = (S(2)*R(2))*(S(2)*R(1)*R(2))$$
$$= R(1)*(S(2)*S(2))*(R(2)*R(2))$$
$$= R(1)$$

hold and D(3,1)=R(1), D(3,2)=R(2), so that the divided data D(3) can be generated from D(1,1)*D(2,1) and D(1,2)*D(2,2).

Also, in the case in which the divided data D(1) is lost and the divided data D(1) is to be generated from the divided data D(2) and D(3), the relationships of:

$$D(1,1)=D(2,1)*R(2)$$

$$D(1,2)=D(2,2)*R(1)$$

hold and D(3,1)=R(1), D(3,2)=R(2), so that the divided data D(1) can be generated from D(2,1)*D(3,2) and D(2,2)*D(3,1).

Also, in the case in which the divided data D(2) is lost and the divided data D(2) is to be generated from the divided data D(1) and D(3), the relationships of:

$$D(2,1)=D(1,1)*R(2)$$

$$D(2,2)=D(1,2)*R(1)$$

hold and D(3,1)=R(1), D(3,2)=R(2), so that the divided data D(2) can be generated from D(1,1)*D(3,2) and D(1,2)*D(3,1).

Next, with reference to a table shown on a right side of FIG. 12, the processing for recovering the original data from the re-divided data will be described. This is the description of the function of the original data recovery unit 12 of the secret information management system 1, at a time of the service utilization after the user received the re-divided data.

First, the first original partial data S(1) can be generated from the divided partial data D'(2,1) and D'(3,1) as follows.

$$D'(2,1)*D'(3,1) = (S(1)*R(1)*R'(1))*(R(1)*R'(1))$$
$$= S(1)*(R(1)*R(1))*(R'(1)*R'(1))$$
$$= S(1)*0*0$$
$$= S(1)$$

Also, the second original partial data S(2) can be generated from the other divided partial data as follows.

$$D'(2,2)*D'(3,1)*D'(3,2) = (S(2)*R(1)*R(2)*R'(1)*R'(2)*$$
$$(R(1)*R'(1))*(R(2)*R'(2))$$
$$= S(2)*(R(1)*R(1))*(R(2)*R(2))*$$
$$(R'(1)*R'(1))*R'(2)*(R'(2))$$
$$= S(2)*0*0*0*0$$
$$= S(2)$$

In general, when j is an odd number, the relationship of:

$$D'(2,j)*D'(3,j) = (S(j)*R(j)*R'(j))*(R(j)*R'(j))$$
$$= S(j)*(R(j)*R(j))*(R'(j)*R'(j))$$
$$= S(j)*0*0$$
$$= S(j)$$

holds, so that S(j) can be obtained by calculating D'(2,j)*D'(3,j).

Also, in general, when j is an odd number, the relationship of:

$$D'(2,j+1)*D'(3,j)*D'(3,j+1) = (S(j+1)*R(j)*R(j+1)*R'(j)*R'(j+1))*$$
$$R(j+1)*(R(j)*R'(j))*(R(j+1)*R'(j+1))$$
$$= S(j+1)*(R(j)*R(j))*(R(j+1)*R(j+1))*$$
$$((R'(j)*R'(j))*(R'(j+1)*R'(j+1))$$
$$= S(j+1)*0*0*0*0$$
$$= S(j+1)$$

holds, so that S(j+1) can be obtained by calculating D'(2,j+1)*D'(3,j)*D'(3,j+1).

Next, the case of recovering the original data S by acquiring D'(1) and D'(3) is as follows. Namely, the relationship of:

$$D'(1,1) * D'(3,1) * D'(3,2) = (S(1) * R(1) * R(2) * R'(1) * R'(2)) *$$
$$(R(1) * R'(1)) * (R(2) * R'(2))$$
$$= S(1) * (R(1) * R(1)) * (R(2) * R(2)) *$$
$$(R'(1) * R'(1)) * (R'(2) * R'(2))$$
$$= S(1) * 0 * 0 * 0 * 0$$
$$= S(1)$$

holds, so that S(1) can be obtained by calculating D'(1,1)*D'(3,1)*D'(3,2).

Similarly, the relationship of:

$$D'(1,2) * D'(3,2) = (S(2) * R(2) * R'(2)) * (R(2) * R'(2))$$
$$= S(2) * (R(2) * R(2)) * (R'(2) * R'(2))$$
$$= S(2) * 0 * 0$$
$$= S(2)$$

holds, so that S(2) can be obtained by calculating D'(1,2)*D'(3,2).

In general, when j is an odd number, the relationship of:

$$D'(1,j) * D'(3,j) * D'(3,j+1) = (S(j) * R(j) * R(j+1) * R'(j) * R'(j+1)) *$$
$$(R(j) * R'(j)) * (R(j+1) * R'(j+1))$$
$$= S(j) * (R(j) * R(j)) * (R(j+1) * R(j+1)) *$$
$$(R'(j) * R'(j)) * (R'(j+1) * R'(j+1))$$
$$= S(j) * 0 * 0 * 0 * 0$$
$$= S(j)$$

holds, so that S(j) can be obtained by calculating D'(1,j)*D'(3,j)*D'(3,j+1).

Also, in general, when j is an odd number, the relationship of:

$$D'(1,j+1) * D'(3,j+1) = (S(j+1) * R(j+1) * R'(j+1)) *$$
$$(R(j+1) * R'(j+1))$$
$$= S(j+1) * (R(j+1) * R(j+1)) *$$
$$(R'(j+1) * R'(j+1))$$
$$= S(j+1) * 0 * 0$$
$$= S(j+1)$$

holds, so that S(j+1) can be obtained by calculating D'(1,j+1)*D'(3,j+1).

Next, the case of recovering the original data S by acquiring the divided data D'(1) and D'(2) is as follows.

Namely, the relationship of:

$$D'(1,1) * D'(2,1) = (S(1) * R(1) * R(2) * R'(1) * R'(2)) *$$
$$(S(1) * R(1) * R'(1))$$
$$= (S(1) * S(1)) * (R(1) * R(1)) * (R'(1) * R'(1)) *$$
$$R(2) * R'(2)$$
$$= 0 * 0 * R(2) * R'(2)$$
$$= R(2) * R'(2)$$

holds, so that R(2)*R'(2) can be obtained by calculating D'(1,1)*D'(2,1).

Similarly, the relationship of:

$$D'(1,2) * D'(2,2) = (S(2) * R(2) * R'(2)) * (S(2) * R(1) * R(2) * R'(1) * R'(2))$$
$$= (S(2) * S(2)) * R(1) * R'(1) * (R(2) * R(2)) *$$
$$(R'(2) * R'(2))$$
$$= 0 * R(1) * R'(1) * 0 * 0$$
$$= R(1) * R'(1)$$

holds, so that R(1)*R'(1) can be obtained by calculating D'(1,2)*D'(2,2).

Using these R(1)*R'(1) and R(2)*R'(2), S(1) and S(2) are obtained as follows. Namely, the relationship of:

$$D'(2,1) * R(1) * R'(1) = (S(1) * R(1) * R'(1)) * R(1) * R'(1)$$
$$= S(1) * (R(1) * R(1)) * (R'(1) * R'(1))$$
$$= S(1) * 0 * 0$$
$$= S(1)$$

holds, so that S(1) can be obtained by calculating D'(2,1)*R(1)*R'(1).

Similarly, the relationship of:

$$D'(1,2) * R(2) * R'(2) = (S(2) * R(2) * R'(2)) * R(2) * R'(2)$$
$$= S(2) * (R(2) * R(2)) * (R'(2) * R'(2))$$
$$= S(2) * 0 * 0$$
$$= S(2)$$

holds, so that S(2) can be obtained by calculating D'(1,2)*R(2)*R'(2).

In general, when j is an odd number, the relationship of:

$$D'(1,j) * D'(2,j) = (S(j) * R(j) * R(j+1) * R'(j) * R'(j+1)) *$$
$$(S(j) * R(j) * R'(j))$$
$$= (S(j) * S(j)) * (R(j) * R(j)) *$$
$$(R'(j) * R'(j)) * R(j+1) * R'(j+1)$$
$$= 0 * 0 * 0 * R(j+1) * R'(j+1)$$
$$= R(j+1) * R'(j+1)$$

holds, so that R(j+1)*R'(j+1) can be obtained by calculating D'(1,j)*D'(2,j).

Also, in general, when j is an odd number, the relationship of:

$$D'(1, j+1) * D'(2, j+1) = (S(j+1) * R(j+1) * R'(j+1)) *$$
$$(S(j+1) * R(j) * R(j+1) * R'(j) * R'(j+1))$$
$$= (S(j+1) * S(j+1)) * R(j) * R'(j) *$$
$$(R(j+1) * R(j+1)) * (R'(j+1) * R'(j+1))$$
$$= 0 * R(j) * R'(j) * 0 * 0$$
$$= R(j) * R'(j)$$

holds, so that R(j)*R'(j) can be obtained by calculating D'(1,j+1)*D'(2,j+1).

Using these R(j)*R'(j) and R(j+1)*R'(j+1), S(j) and S(j+1) are obtained as follows. Namely, the relationship of:

$$D'(2, j) * R(j) * R'(j) = (S(j) * R(j) * R'(j)) * R(j) * R'(j)$$
$$= S(j) * (R(j) * R(j)) * (R'(j) * R'(j))$$
$$= S(j) * 0 * 0$$
$$= S(j)$$

holds, so that S(j) can be obtained by calculating D'(2,j)*R(j)*R'(j).

Similarly, the relationship of:

$$D'(1, j+1) * R(j+1) * R'(j+1) = (S(j+1) * R(j+1) * R'(j+1)) *$$
$$(R(j+1) * R'(j+1))$$
$$= S(j+1) * (R(j+1) * R(j+1)) *$$
$$(R'(j+1) * R'(j+1))$$
$$= S(j+1) * 0 * 0$$
$$= S(j+1)$$

holds, so that S(j+1) can be obtained by calculating D'(1,j+1)*R(j+1)*R'(j+1).

As described above, when the re-divided data are generated by the random number additional incorporation scheme, it is possible to recover the original data by using two re-divided data among three re-divided data, without using all of the three re-divided data D'(1), D'(2) and D'(3).

Also, in the random number additional incorporation scheme, it is possible to carry out the data re-division processing without recovering the original data once (the original data does not appear in a visible form), so that the more secure data management becomes possible.

(Random Number Rewriting Scheme)

Figure 13:
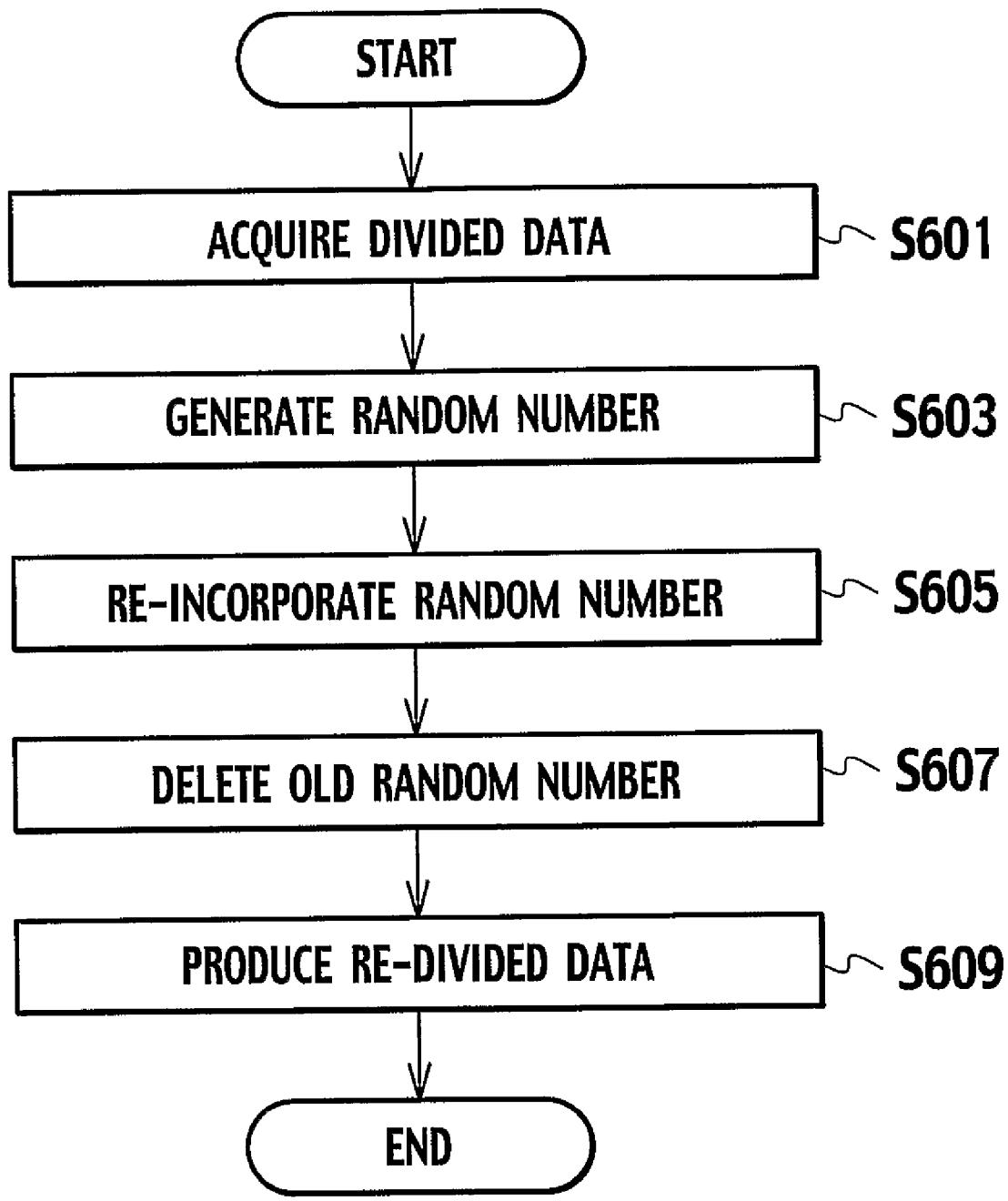
FIG. 13 is a flow chart showing a data re-division processing based on a random number rewriting scheme by the secret information management system shown in FIG. 1.

FIG. 13 shows an outline of the data re-division processing in the random number rewriting scheme.

As shown in FIG. 13, the divided data D(1), D(2) and D(3) are acquired first (step S601), and then the random number R' to be used at a time of the re-division is generated at the random number generation unit 15 (step S603).

Next, the random number R' is incorporated into each one of the divided data D(1), D(2) and D(3) according to the random number additional incorporation scheme described above (step S605). Then, the old random number R is deleted from the divided data into which the random number R' is incorporated (step S607), and then the new divided data D'(1), D'(2) and D'(3) are generated (step S609).

Figure 14:
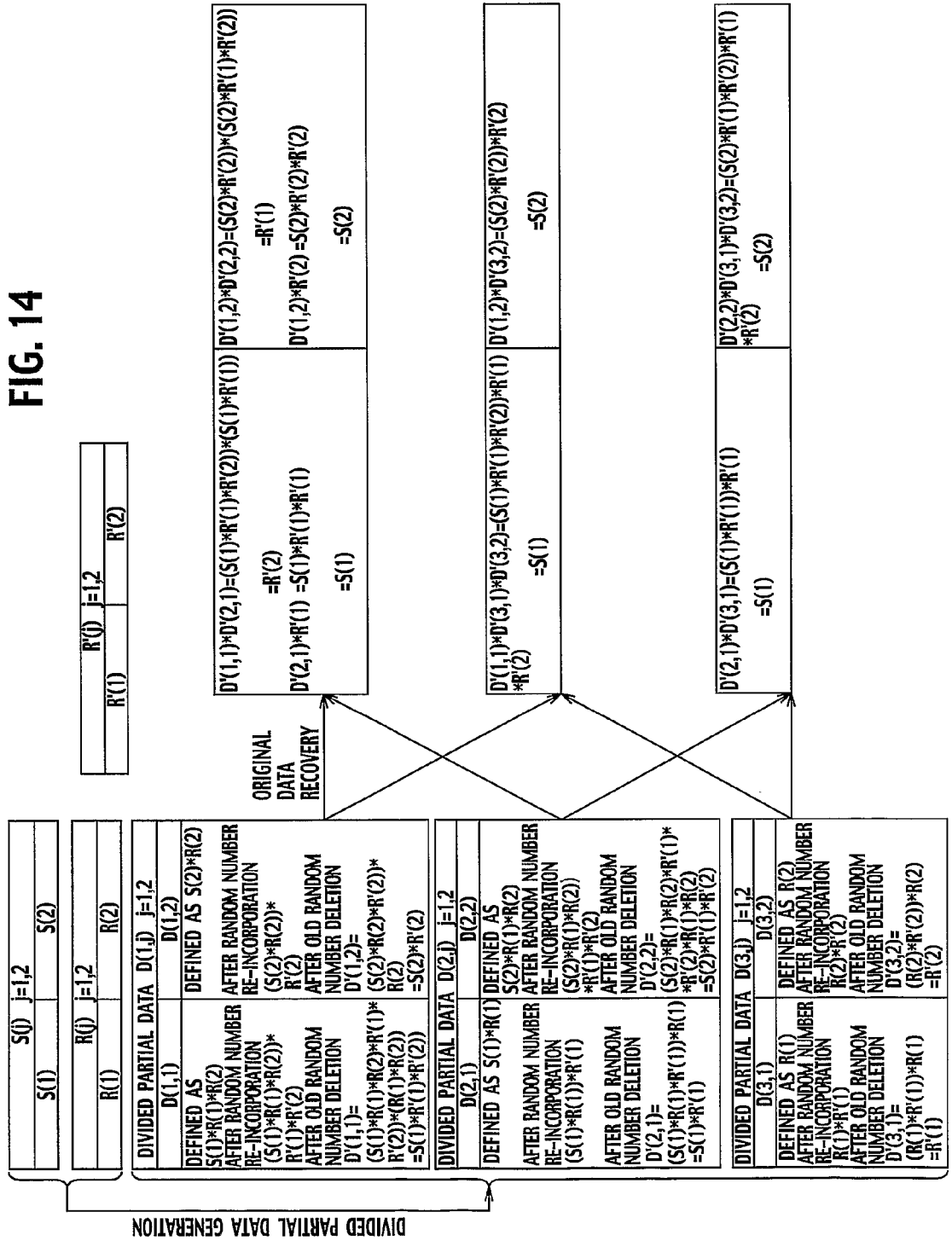
FIG. 14 is a table showing an example of divided partial data and their definition formula in the case of division into three by the random number rewriting scheme according to the second embodiment of the present invention.

FIG. 14 is a table that shows the definition formula for the divided partial data in the case dividing the original data S into three (the number of division n=3) by using the processing unit bit length b which is a half of the length of the original data S, the definition formula of the divided partial data after the re-incorporation of the random number R', the definition formula of the divided partial data after the deletion of the random number R, and the calculation formula in the case of recovering the original data S from the divided partial data.

In this scheme, the processing up to the step S605 are the same as the random number additional incorporation scheme described above, so that their description will be omitted, and the definition formula of the divided partial data after deleting the old random number R will be described.

First, for the first divided data D'(1), as shown in FIG. 14, the first divided partial data D'(1,1) is defined by the definition formula (S(1)*R(1)*R(2)*R'(1)*R'(2))*(R(1)*R(2), i.e., S(1)*R'(1)*R'(2), and the second divided partial data D'(1,2) is defined by the definition formula (S(2)*R(2)*R'(2))*R(2), i.e., S(2)*R'(2). Note that the general form of the definition formula is S(j)*R'(j)*R'(j+1) for D'(1,j) and S(j+1)*R'(j+1) for the D'(1,j+1) (where j is assumed to be an odd number).

Also, for the second divided data D'(2), as shown in FIG. 14, the first divided partial data D'(2,1) is defined by the definition formula (S(1)*R(1)*R'(1))*R(1), i.e., S(1)*R'(1), and the second divided partial data D'(2,2) is defined by the definition formula (S(2)*R(1)*R(2)*R'(1)*R'(2))*R(1)*R(2), i.e., S(2)*R'(1)*R'(2). Note that the general form of the definition formula is S(j)*R'(j) for D'(2,j) and S(j+1)*R'(j)*R'(j+1) for the D'(2,j+1) (where j is assumed to be an odd number).

Also, for the third divided data D'(3), as shown in FIG. 14, the first divided partial data D'(3,1) is defined by the definition formula (R(1)*R'(1))*R(1), i.e., R'(1), and the second divided partial data D'(3,2) is defined by the definition formula (R(2)*R'(2))*R(2), i.e., R'(2). Note that the general form of the definition formula is R'(j) for D'(3,j) and R'(j+1) for the D'(3,j+1) (where j is assumed to be an odd number).

As such, the re-divided partial data D'(i,j) is obtained by calculating the exclusive OR by incorporating the random number partial data R'(j) corresponding to the random number partial data R(j) that was incorporated by the definition formula of the divided partial data D(i,j), into the divided partial data D(i,j), and then incorporating the random number partial data R(j) such that the random number partial data R(j) is deleted.

As a result, the definition formula of the re-divided partial data D'(i,j) is one in which the random number partial data R(j) is replaced by the random number partial data R'(j) in the definition formula of the original divided partial data D(i,j).

Next, with reference to a table shown on a right side of FIG. 14, the processing for recovering the original data from the re-divided data will be described. This is the description of the function of the original data recovery unit 12 of the secret information management system 1, at a time of the service utilization after the user received the re-divided data.

First, the first original partial data S(1) can be generated from the divided partial data D'(2,1) and D'(3,1) as follows.

$$D'(2, 1) * D'(3, 1) = (S(1) * R'(1)) * R'(1)$$
$$= S(1) * (R'(1) * R'(1))$$

-continued
$$= S(1) * 0$$
$$= S(1)$$

Also, the second original partial data S(2) can be generated from the other divided partial data as follows.

$$D'(2,2)*D'(3,1)*D'(3,2) = (S(2)*R'(1)*R'(2))*R'(1)*R'(2)$$
$$= S(2)*(R'(1)*R'(1))*(R'(2)*R'(2))$$
$$= S(2)*0*0$$
$$= S(2)$$

In general, when j is an odd number, the relationship of:

$$D'(2,j)*D'(3,j) = (S(j)*R'(j))*R'(j)$$
$$= S(j)*(R'(j)*R'(j))$$
$$= S(j)*0$$
$$= S(j)$$

holds, so that S(j) can be obtained by calculating D'(2,j)*D'(3,j).

Also, in general, when j is an odd number, the relationship of:

$$\begin{aligned} D'(2,j+1)*D'(3,j)* \\ D'(3,j+1) \end{aligned} = (S(j+1)*R'(j)*R'(j+1))*R'(j)*R'(j+1)$$
$$= S(j+1)*(R'(j)*R'(j))*(R'(j+1)*R'(j+1))$$
$$= S(j+1)*0*0$$
$$= S(j+1)$$

holds, so that S(j+1) can be obtained by calculating D'(2,j+1)*D'(3,j)*D'(3,j+1).

Next, the case of recovering the original data S by acquiring D'(1) and D'(3) is as follows. Namely, the relationship of:

$$\begin{aligned} D'(1,1)*D'(3,1) \\ D'(3,2) \end{aligned} = (S(1)*R'(1)*R'(2))*R'(1))*R'(2))$$
$$= S(1)*(R'(1)*R'(1))*(R'(2)*R'(2))$$
$$= S(1)*0*0$$
$$= S(1)$$

holds, so that S(1) can be obtained by calculating D'(1,1)*D'(3,1)*D'(3,2).

Similarly, the relationship of:

$$D'(1,2)*D'(3,2) = (S(2)*R'(2))*R'(2)$$
$$= S(2)*(R'(2)*R'(2))$$
$$= S(2)*0$$
$$= S(2)$$

holds, so that S(2) can be obtained by calculating D'(1,2)*D'(3,2).

In general, when j is an odd number, the relationship of:

$$\begin{aligned} D'(1,j)*D'(3,j)* \\ D'(3,j+1) \end{aligned} = (S(j)*R'(j)*R'(j+1))*R'(j)*R'(j+1)$$
$$= S(j)*(R'(j)*R'(j))*(R'(j+1)*R'(j+1))$$
$$= S(j)*0*0$$
$$= S(j)$$

holds, so that S(j) can be obtained by calculating D'(1,j)*D'(3,j)*D'(3,j+1).

Also, in general, when j is an odd number, the relationship of:

$$D'(1,j+1)*D'(3,j+1) = (S(j+1)*R'(j+1))*R'(j+1))$$
$$= S(j+1)*(R'(j+1)*R'(j+1))$$
$$= S(j+1)*0$$
$$= S(j+1)$$

holds, so that S(j+1) can be obtained by calculating D'(1,j+1)*D'(3,j+1).

Next, the case of recovering the original data S by acquiring the divided data D'(1) and D'(2) is as follows.

Namely, the relationship of:

$$D'(1,1)*D'(2,1) = (S(1)*R'(1)*R'(2))*(S(1)*R'(1))$$
$$= (S(1)*S(1))*(R'(1)*R'(1))*R'(2)$$
$$= 0*0*R'(2)$$
$$= R'(2)$$

holds, so that R'(2) can be obtained by calculating D'(1,1)*D'(2,1).

Similarly, the relationship of:

$$D'(1,2)*D'(2,2) = (S(2)*R'(2))*(S(2)*R'(1)*R'(2))$$
$$= (S(2)*S(2))*(R'(2)*R'(2))*R'(1)$$
$$= 0*0*R'(1)$$
$$= R'(1)$$

holds, so that R'(1) can be obtained by calculating D'(1,2)*D'(2,2).

Using these R'(1) and R'(2), S(1) and S(2) are obtained as follows. Namely, the relationship of:

$$D'(2,1)*R'(1) = (S(1)*R'(1))*R'(1)$$
$$= S(1)*(R'(1)*R'(1))$$
$$= S(1)*0$$
$$= S(1)$$

holds, so that S(1) can be obtained by calculating D'(2,1)*R'(1).

Similarly, the relationship of:

$$D'(1,2) * R'(2) = (S(2) * R'(2)) * R'(2)$$
$$= S(2) * (R'(2) * R'(2))$$
$$= S(2) * 0$$
$$= S(2)$$

holds, so that S(2) can be obtained by calculating D'(1,2)*R(2)*R'(2).

In general, when j is an odd number, the relationship of:

$$D'(1,j) * D'(2,j) = (S(j) * R'(j) * R'(j+1)) * (S(j) * R'(j))$$
$$= (S(j) * S(j)) * (R'(j) * R'(j)) * R'(j+1)$$
$$= 0 * 0 * R'(j+1)$$
$$= R'(j+1)$$

holds, so that R'(j+1) can be obtained by calculating D'(1,j)*D'(2,j).

Also, in general, when j is an odd number, the relationship of:

$$D'(1,j+1) * D'(2,j+1) = (S(j+1) * R'(j+1)) *$$
$$(S(j+1) * R'(j) * R'(j+1))$$
$$= (S(j+1) * S(j+1)) *$$
$$(R'(j+1) * R'(j+1)) * R'(j)$$
$$= 0 * 0 * R'(j)$$
$$= R'(j)$$

holds, so that R'(j) can be obtained by calculating D'(1,j+1)*D'(2,j+1).

Using these R'(j) and R'(j+1), S(j) and S(j+1) are obtained as follows. Namely, the relationship of:

$$D'(2,j) * R'(j) = (S(j) * R'(j)) * R'(j)$$
$$= S(j) * (R'(j) * R'(j))$$
$$= S(j) * 0$$
$$= S(j)$$

holds, so that S(j) can be obtained by calculating D'(2,j)*R'(j).

Similarly, the relationship of:

$$D'(1,j+1) * R'(j+1) = (S(j+1) * R'(j+1)) * R'(j+1))$$
$$= S(j+1) * (R'(j+1) * R'(j+1))$$
$$= S(j+1) * 0$$
$$= S(j+1)$$

holds, so that S(j+1) can be obtained by calculating D'(1,j+1)*R'(j+1).

As described above, when the re-divided data are generated by the random number rewriting scheme, it is possible to recover the original data by using two re-divided data among three re-divided data, without using all of the three re-divided data D'(1), D'(2) and D'(3).

Also, in the random number rewriting scheme, it is possible to carry out the data re-division processing without recovering the original data once (the original data does not appear in a visible form), so that the more secure data management becomes possible.

<Operation>

Figure 15:
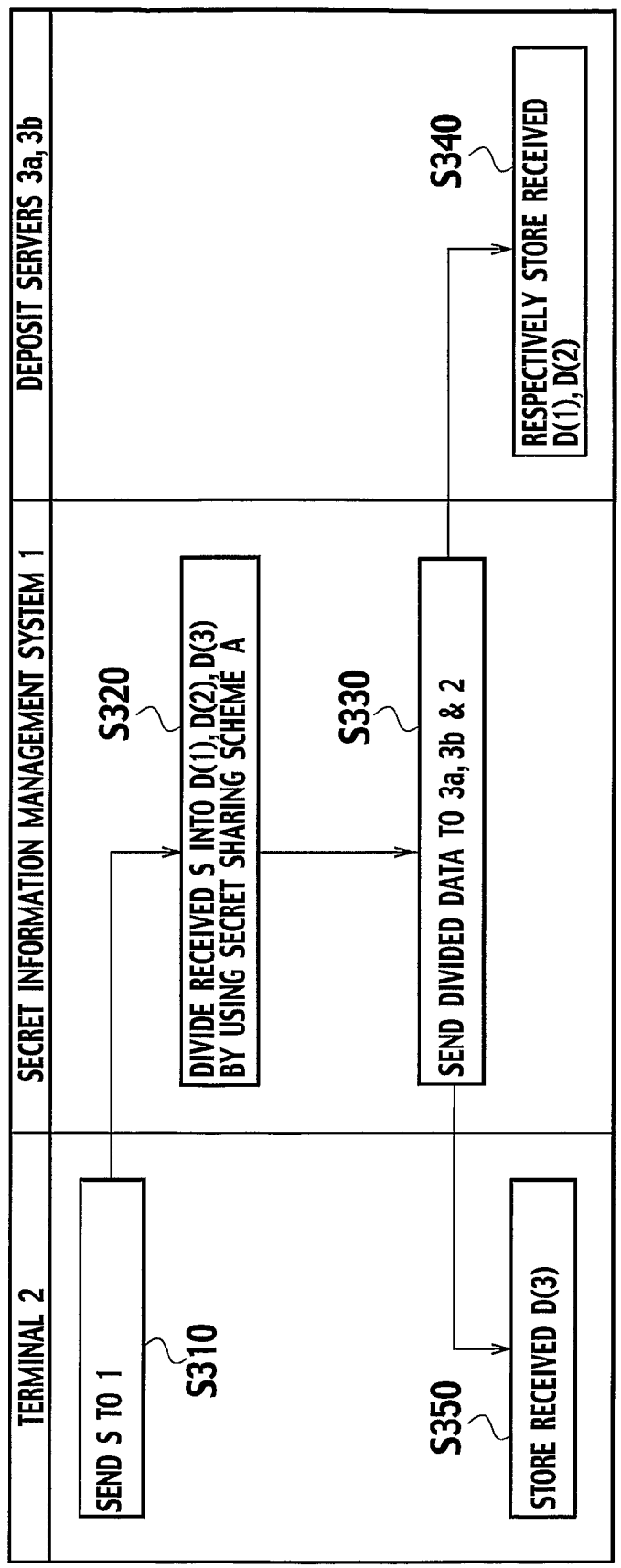
FIG. 15 is a sequence chart showing a processing for registering a secret information by the secret information management system shown in FIG. 5.
Figure 16:
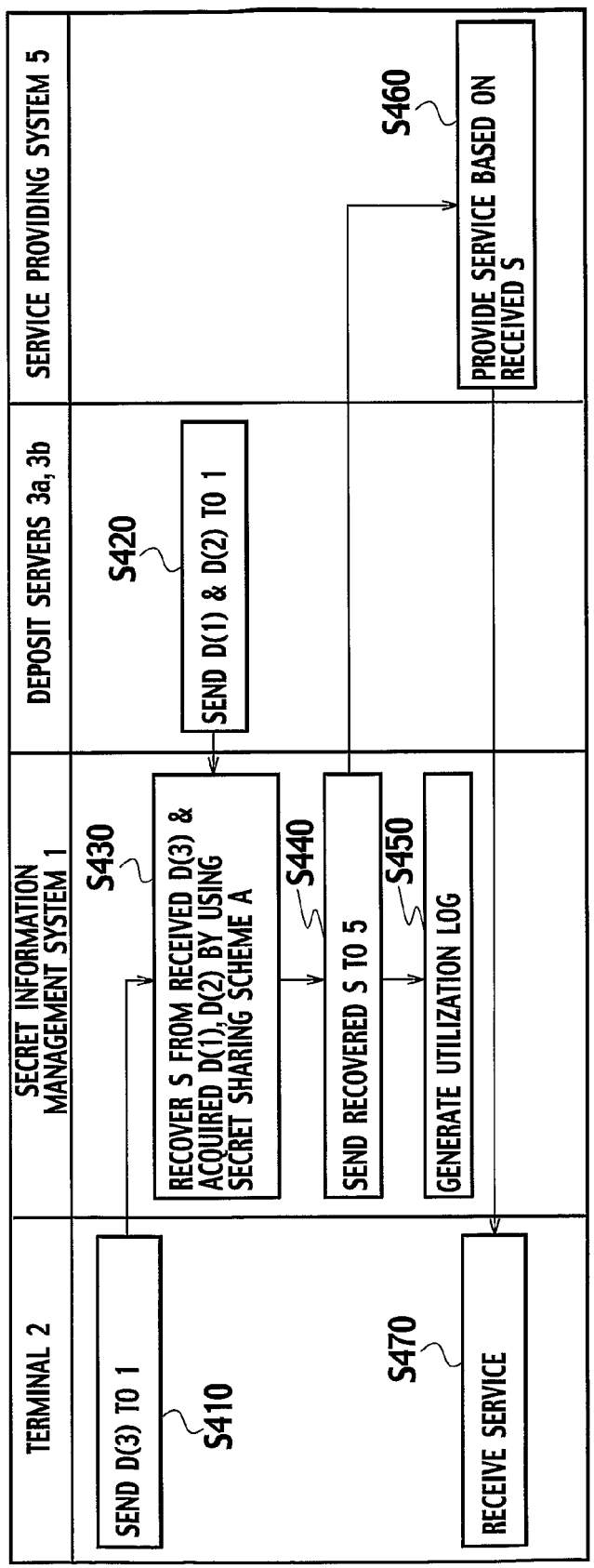
FIG. 16 is a sequence chart showing a processing by the secret information management system shown in FIG. 5 at a time of service utilization.
Figure 17:
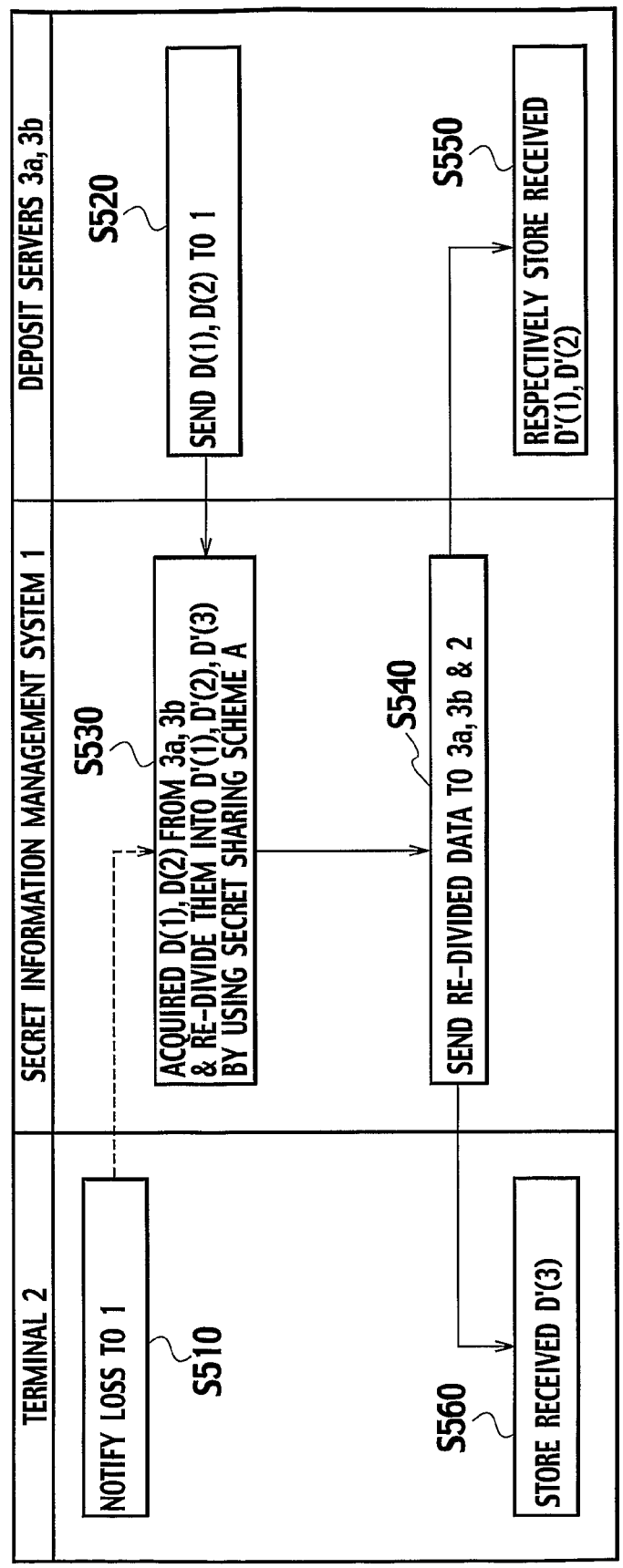
FIG. 17 is a sequence chart showing a processing by the secret information management system shown in FIG. 5 when a part of a secret information owned by a user is lost.

Next, the operation of the entire computer system 10 using the secret information management system 1 according to this embodiment will be described. Here, FIG. 15 shows an operation by which the user registers the secret information S in the secret information management system 1, FIG. 16 shows an operation of the secret information management system 1 when the user utilizes the service, and FIG. 17 shows an operation of the secret information management system 1 when the user lost the user's own divided data D.

(1) Secret Information Registration Processing

First, the user transmits the secret information S from the terminal 2 through the communication network 4 to the secret information management system 1 (step S310). Upon receiving the secret information S, the secret information management system 1 divides the secret information S into three data (divided data) D(1), D(2) and D(3) by using the secret sharing scheme A (step S320).

Next, the secret information management system 1 transmits the divided data generated in this way respectively to the deposit servers 3*a* and 3*b* and the terminal 2 through the communication network 4 (step S330).

Next, the deposit servers 3*a* and 3*b* respectively store the received divided data D(1) and D(2) into their memory devices such as hard disks (step S340). Also, the terminal 2 stores the received divided data D(3) into its memory device such as hard disk (step S350).

In this way, even when there is a loss, destruction, etc. occurs for any one of the divided data of the terminal 2 and the deposit servers 3*a* and 3*b*, the original secret information 3 can be recovered according to the remaining two divided data.

(2) Service Utilization Processing

In the case where the user utilizes the service providing system 5, first, the divided data D(3) maintained at the terminal 2 is transmitted to the secret information management system 1 through the communication network 4 (step S410).

Upon receiving the divided data D(3) from the terminal 2, the secret information management system 1 requests the remaining divided data D(1) and D(2) to the deposit servers 3*a* and 3*b*, and receives these divided data D(1) and D(2) (step S420).

Next, the secret information management system 1 recovers the secret information S from any two of the divided data D(1), D(2) and D(3) by using the secret sharing scheme A (step S430), Then, the recovered secret information S is transmitted to the service providing system 5 (step S440), and the utilization log is generated by recording the fact that the secret information S is recovered and transmitted (step S450).

Upon receiving the secret information S from the secret information management system 1, the service providing system 5 judges the properness of this secret information S, and provides the service to the terminal 2 through the communication network 4 (step S460) such that the user can receive the desired service (step S470).

(3) Processing at a Time of Divided Data Loss

In the case where the user lost the divided data D(3) (the case where the terminal 2 that stores the divided data D(3) is lost, for example), first, the user reports this fact to the secret information management system 1 (by calling an operator of the secret information management system 1, for example) (step S510).

In response, the secret information management system 1 requests the divided data to the deposit servers 3a and 3b, and receives the divided data D(1) and D(2) respectively from the deposit servers 3a and 3b (step S520).

Next, the secret information management system 1 generates three new data (re-divided data) D'(1), D'(2) and D'(3) from the divided data D(1) and D(2) by using the secret sharing scheme A (step S530).

Here, the re-divided data D'(1) and D'(2) are generated respectively from the divided data D(1) and D(2) according to the random number additional incorporation scheme or the random number rewriting scheme described above. On the other hand, as for D'(3), the divided data D(3) is generated from the divided data D(1) and D(2) first and then D'(3) is generated from the divided data D(3) according to the random number additional incorporation scheme or the random number rewriting scheme described above.

Next, the secret information management system 1 transmits the re-divided data generated in this way respectively to the deposit servers 3a and 3b and the terminal 2 (the terminal 2 newly purchased by the user in the case where the user has lost the terminal 2 that stores the divided data D(3)) through the communication network 4 (step S240).

Next, the deposit servers 3a and 3b respectively store the received re-divided data D'(1) and D'(2) into their memory devices such as hard disks (step S550). Also, the terminal 2 stores the received re-divided data D'(3) into its memory device such as hard disk (step S560). In this way, it becomes possible for the user to utilize the service again.

Thus, according to this embodiment, the secret information S that is necessary at a time of receiving the prescribed service is divided into a plurality of divided data by using the secret sharing scheme A, and the user is required to maintain only a part of the divided data, so that the secret information S can be recovered from the remaining divided data even when the divided data maintained by the user is lost, and then the re-divided data are newly generated by using the secret sharing scheme A and the user is newly required to maintain only a part of the re-divided data, so that there is no need to change the secret information S.

As a result, even when the user loses the user's own divided data, it is possible to receive the service again by simply reporting the loss, without requiring the processing for re-issuing the secret information S.

In particular, the secret sharing scheme A according to this embodiment is a data division method for dividing the secret information into the divided data in a desired number of division according to a desired processing unit bit length, in which the divided data in a desired number of division are generated by generating a plurality of original partial data by partitioning the secret information in units of the processing unit bit length, generating a plurality of random number partial data of the processing unit bit length from a random number in a length shorter than or equal to the bit length of the secret information, in correspondence to respective ones of the plurality of the original partial data, and generating each divided partial data in the processing unit bit length that constitutes each divided data by calculating the exclusive OR of the original partial data and the random number partial data, while the secret information can be recovered from a prescribed sets of the divided data among the generated divided data, and also the re-divided data in a desired number of division are generated by generating a plurality of random number partial data of the processing unit bit length from a newly generated random number, and generating the re-divided partial data in the processing unit bit length by calculating the exclusive OR of the divided partial data and the random number partial data, while the secret information can be recovered from a prescribed sets of the re-divided data among the generated re-divided data, so that it is possible to re-divide the secret information without recovering the secret information. As a result, it becomes possible to manage the secret information of the user more securely.

Also, even when the third person who acquired the lost divided data accesses the secret information management system 1, the secret information S cannot be recovered and the service cannot be utilized, so that the safety is secured.

Moreover, the user's utilization log is maintained at the secret information management system 1, so that even if the third person acquires the lost divided data and illegally utilize the service during a period since the user loses the divided data until the user reports the loss, the presence or absence of the illegal utilization can be judged according to the utilization log.

Note that, the secret sharing scheme A of this embodiment does not require the multiple length integer calculation processing including the polynomial calculation, the residue calculation, etc., so that it is possible to carry out the division and the recovery of the data easily and quickly even in the case of processing many large capacity data.

Note that, in the above, the secret information S is given from the terminal 2 to the secret information management system 1 through the communication network 4, but this embodiment is not limited to this case, and it is also possible to use a mechanism other than the communication network 4, such as mailing a recording medium that records the secret information S, for example. Similarly, in the above, the divided data to be maintained by the user is received through the communication network 4, but this embodiment is not limited to this case, and it is also possible to use a mechanism other than the communication network 4, such as mailing a recording medium that records the divided data, for example.

Also, in the above, at a time of the service utilization by the user, the secret information management system 1 recovered the secret information S, but this embodiment is not limited to this case, and it is also for the terminal 2 of the user to recover the secret information S from the divided data stored at the terminal 2 and the divided data acquired from the secret information management system 1 by using the secret sharing scheme, and transmit that secret information to the service providing system 5. In such a case, the secret information management system 1 is adapted to transmit a combination of as many of the divided data stored in the deposit servers as the prescribed number minus a number of the divided data maintained by the user, to the terminal, at a time of recovering the secret information.

Note however that, in this case, if the user loses the terminal 2 while the recovered secret information S is still stored therein, the problem to be solved by the present invention cannot be solved, so that there is a need to provide a mechanism for deleting the secret information S from the terminal 2 immediately after transmitting it to the service providing system 5, or a mechanism for preventing the illegal reading of the data of the terminal 2 by the third person.

Moreover, in the above, the re-division processing is carried out upon a request from the user, but it is also possible for the secret information management system 1 to carry out the re-division processing voluntarily at a prescribed timing.

Figure 18:
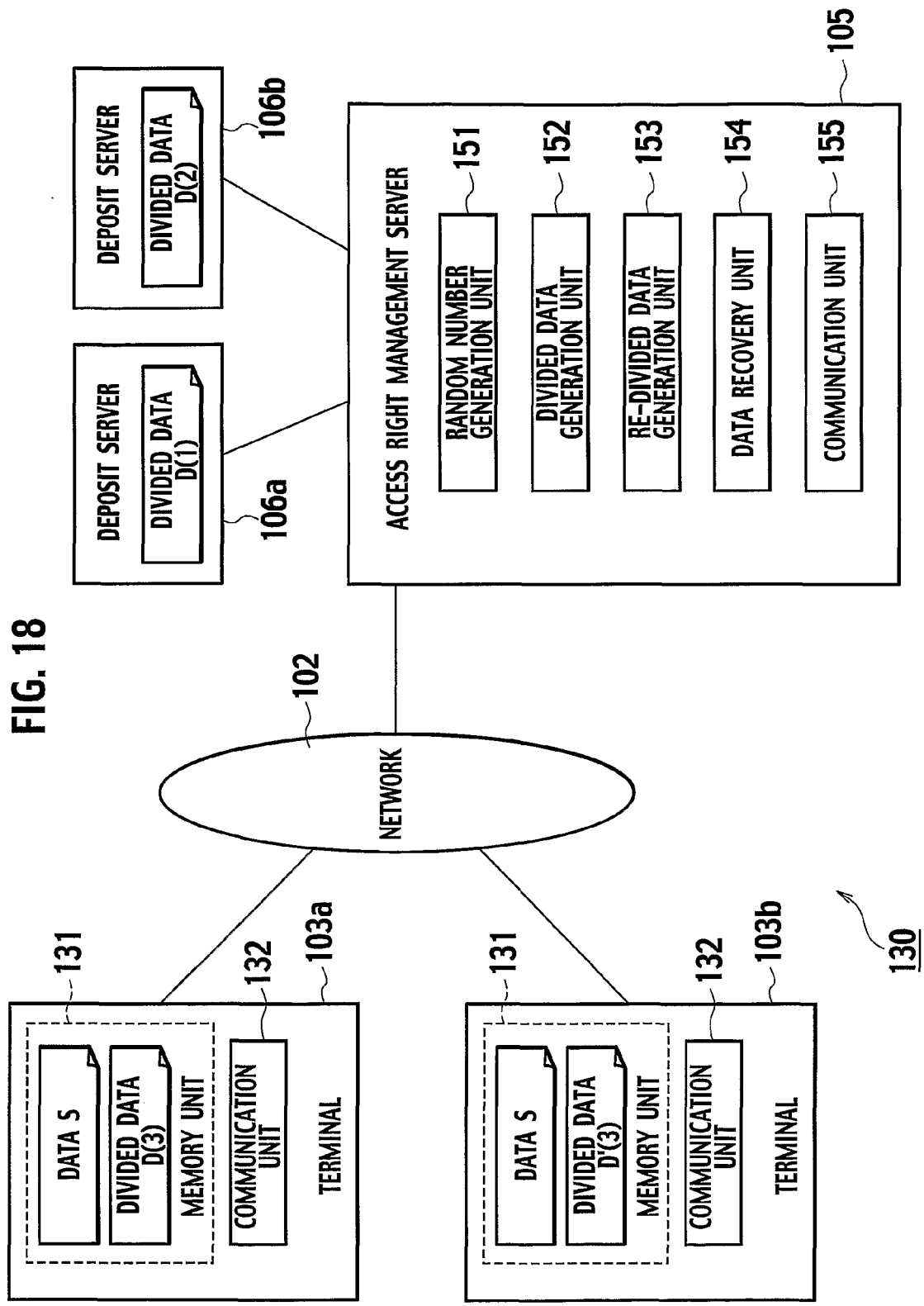
FIG. 18 is a block diagram showing a schematic configuration of an access right management system according to the third embodiment of the present invention.
Figure 19:
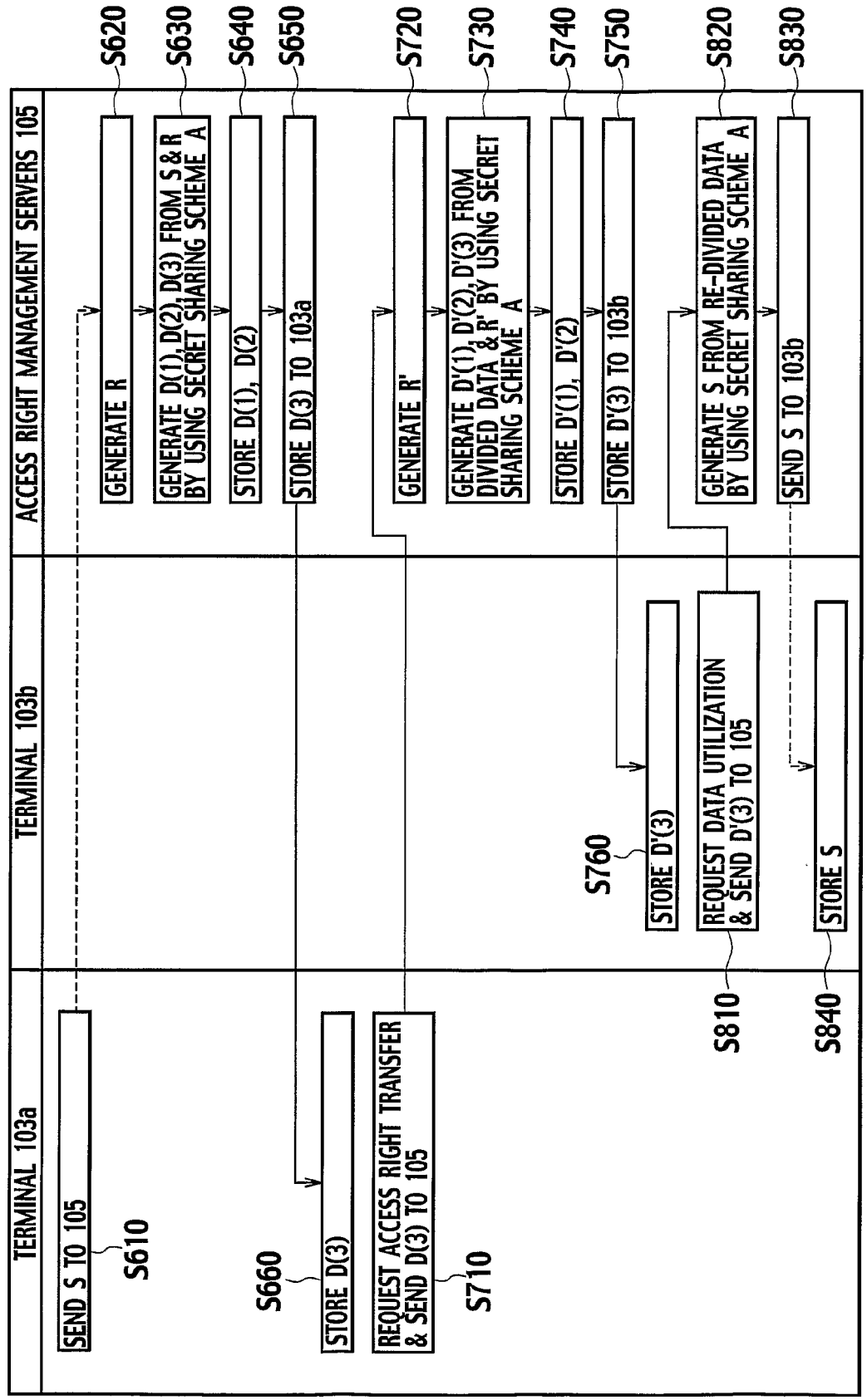
FIG. 19 is a sequence chart showing an operation of the access right management system shown in FIG. 18.

Referring now to FIG. 18 and FIG. 19, the third embodiment of the present invention will be described.

Conventionally, as a method for limiting accesses to the data owned by the user, there is a method for limiting accesses to the data by encrypting the data. For example, in order to prevent accesses from the others with respect to the data to be hidden or the important secret data, the data are managed in an encrypted state. In such a case, the encrypted data cannot be decrypted by anyone other than the owner of the encryption key.

However, in the case where it is desired to transfer the access right for such an encrypted data to another person (including the case where it is desired to transfer the encrypted data itself to another person), there is a need for the user to decrypt the encrypted data once by using the own encryption key and for another person to encrypt the data by using the own encryption key after the transfer. In this case, the encrypted data is decrypted once and transferred in the non-encrypted state, so that if the data in this state is leaked, there is a problem that the security cannot be sufficiently secured.

This third embodiment is a variation of the second embodiment described above, which is capable of sufficiently securing the security by avoiding the danger of the data leakage due to the data decryption, even in the case of transferring the access right for the data under the access limitation using the encryption to another person.

FIG. 18 shows an overall schematic configuration of an access right management system 130 according to the third embodiment.

As shown in FIG. 18, in the access right management system 130, client terminals (which will be referred hereafter simply as terminals) 103$i$ (i=a, b) owned by users and an access right management server 105 are connected through a communication network 102 such that each terminal 103$i$ and the access right management server 105 can communicate with each other. The access right management server 105 is also connected with a plurality (which is assumed to be two in this embodiment) of data depositing server computers (which will be referred hereafter simply as deposit servers) 106$a$ and 106$b$ which are formed by mutually independent hardwares. In this embodiment, among a pair of the terminals 103$a$ and 103$b$, a user of the terminal 103$a$ will be referred to as X (an access right transferring side) and a user of the terminal 103$b$ will be referred to as Y (an access right receiving side).

Each terminal 103$i$ is a terminal for maintaining the data S to which accesses should be limited, and has a memory unit 131 and a communication unit 132.

The memory unit 131 stores the data S to which accesses should be limited, and the divided data D(3) transmitted from the access right management server 105. In FIG. 18, the divided data of the terminal 103$a$ is denoted as D(3), and the divided data of the terminal 103$b$ is denoted as D'(3).

The communication unit 132 carries out transmission and reception of data between the terminal 103$i$ and the access right management server 105.

The access right management server 105 divides the data for which X has the access right into a plurality of data by using the secret sharing scheme A described above, and the divided data are respectively transmitted to the deposit servers 106$a$ and 106$b$ and the terminal 103$a$ such that the divided data are respectively deposited in the deposit servers 106$a$ and 106$b$ and the terminal 103$a$. In FIG. 18, the access right management server 105 divides the data S into three divided data D(1), D(2) and D(3) and store them into the deposit servers 106$a$ and 106$b$ and the terminal 103$a$, respectively.

Also, the access right management server 105 generates the re-divided data D'(1), D'(2) and D'(3) from the divided data D(1), D(2) and D(3) by using the secret sharing scheme A described above, and stores them into the deposit servers 106$a$ and 106$b$ and the terminal 103$b$, respectively.

Note also that, in this embodiment, the exemplary case of depositing the data S by dividing it into three will be described, but the present invention is not limited to this case of dividing the data S into three, and the present invention is also applicable to the case of the division into n (n is an integer greater than or equal to 2). Also, the number of the divided data to be transmitted to the terminal 103$i$ is not necessarily one and can be plural. Moreover, in this embodiment, the divided data D(1) and D(2) (re-divided data D'(1) and D'(2)) are allocated to the deposit servers 106 and the divided data D(3) (re-divided data D'(3)) is allocated to the terminal 103$i$, but it is possible to allocate any divided data to any one of the deposit servers 106 and the terminal 103$i$. Furthermore, in this embodiment, a part of the divided data (re-divided data) are deposited into the deposit servers 106$a$ and 106$b$, but they may be managed inside the access right management server 105.

The access right management server 105 has a detailed configuration which has a random number generation unit 151 for generating a random number R to be used in generating a plurality of divided data D from the data S and a random number R' to be used in generating the re-divided data D', a divided data generation unit 152 for dividing the data S into a plurality of divided data D by using the secret sharing scheme A, a re-divided data generation unit 153 for generating a plurality of re-divided data D' from a plurality of divided data D by using the secret sharing scheme A, at a time of transferring the access right from X to Y, a data recovery unit 154 for recovering the data S from a plurality of re-divided data D' by using the secret sharing scheme A, and a communication unit 155 for transmitting or receiving data with respect to the terminals 103$i$ and the deposit servers 106$a$ and 106$b$.

Here, each of the terminals 103$i$, the access right management server 105, and the deposit servers 106$a$ and 106$b$, is formed by an electronic device having at least a central processing unit (CPU) with a calculation function and a control function, and a main memory unit (memory) such as RAM with a function for storing programs and data. Such a device and the system may also have a auxiliary memory unit such as hard disk, besides the main memory unit.

Here, the communication unit 132 of the terminal 103$i$, the random number generation unit 151, the divided data generation unit 152, the re-divided data generation unit 153, the data recovery unit 154 and the communication unit 155 of the access right management server 105 are realized by the calculation and control functions by the CPU, Also, the memory unit 131 of the terminal 103$i$ and the deposit servers 106$a$ and 106$b$ are realized by the functions of the main memory unit and the auxiliary memory unit.

Also, the program for executing various processing according to this embodiment is stored in the main memory unit or the hard disk (i.e., one type of a non-transitory computer-readable medium). It is also possible to record this program in the computer readable recording medium such as hard disk, flexible disk, CD-ROM, MO, DVD-ROM, etc. (i.e., other types of non-transitory computer-readable media), and it is also possible to deliver this program through the communication network.

Next, with reference to FIG. 19, the operation of the access right management system 130 according to this embodiment will be described. FIG. 19 shows a sequence of exchange of data between the terminals 103$a$ and 103$b$ and the access right management server 105 at a time of transferring the access right of the data S from X to Y.

First, in the case where X has the access right for the data S, the data S is transmitted from the terminal 103*a* of X to the access right management server 105 (step S610). Note that, at a time of transmitting the data D, it is possible to use the secure communication network (such as LAN, IP-VPN, dedicated line, telephone line, for example, which is not the open communication network such as the Internet network) for preventing the leakage of the communication contents, or use a delivery mechanism such as mail, for example, rather than the communication through the communication network.

Upon receiving the data S from the terminal 103*a*, the access right management server 105 generates the random number R of X (step S620), and generates three data (divided data) D(1), D(2) and D(3) by using the secret sharing scheme A described above (step S430). More specifically, for example, the access right management server 105 generates:

$$D(1)=(S(1)*R(1)*R(2))\|(S(2)*R(2))$$

$$D(2)=(S(1)*R(1))\|(S(2)*R(1)*R(2))$$

$$D(3)=R(1)\|R(2)$$

where $\|$ denotes a concatenation of the bit sequence and the bit sequence.

Next, the access right management server 105 deposits the divided data D(1) and D(2) into the deposit servers 106*a* and 106*b*, respectively (step S640), and transmits the divided data D(3) to the terminal 103*a* of X through the communication network 102 (step S650). Note that the divided data D(3) is defined as D(3)=R(1)$\|$R(2) as described above, so that the transmission of the divided data D(3) is the same as the transmission of the random number R.

Upon receiving the divided data D(3) from the access right management server 105, the terminal 103*a* stores the divided data D(3) into the memory unit 131 (step S660).

By the above operation, the access right of X with respect to the data S is going to be managed by the access right management server 105.

Next, in the case where X transfers the access right for the data S to Y, the request for the transfer of the access right for the data S from X to Y and the divided data D(3) are transmitted from the terminal 103*a* of X to the access right management server 105 through the communication network 102 (step S710).

Upon receiving the request for the transfer of the access right from X to Y and the divided data D(3) from the terminal 103*a*, the access right management server 105 generates the random number R' of Y (step S720), and generates three new data (re-divided data) D'(1), D'(2) and D'(3) from the divided data D(1), D(2) and D(3) by using the secret sharing scheme A (step S730). More specifically, for example, the access right management server 105 generates:

$$D'(1)=(S(1)*R'(1)*R'(2))\|(S(2)*R'(2))$$

$$D'(2)=(S(1)*R'(1))\|(S(2)*R'(1)*R'(2))$$

$$D'(3)=R'(1)\|R'(2)$$

Next, the access right management server 105 deposits the re-divided data D'(1) and D'(2) into the deposit servers 106*a* and 106*b*, respectively (step S740), and transmits the re-divided data D'(3) to the terminal 103*b* of Y through the communication network 102 (step S750). Note that the divided data D'(3) is defined as D'(3)=R'(1)$\|$R'(2) as described above, so that the transmission of the divided data D'(3) is the same as the transmission of the random number R'.

Upon receiving the re-divided data D'(3) from the access right management server 105, the terminal 103*b* stores the re-divided data D'(3) into the memory unit 131 (step S760).

By the above operation, the access right with respect to the data S is transferred from X to Y.

Next, in the case where Y utilizes the data S, the utilization request for the data S and the re-divided data D'(3) are transmitted from the terminal 103*b* of Y to the access right management server 105 (step S810).

Upon receiving the utilization request for the data S and the re-divided data D'(3) from the terminal 103*b*, the access right management server 105 acquires the re-divided data D'(1) and D'(2) deposited in the deposit servers 106*a* and 106*b*, and recovers the data S from arbitrary two among these re-divided data D'(1), D'(2) and D'(3) by using the secret sharing scheme A (step S820).

Next, the access right management server 105 transmits the recovered data S to the terminal 103*b* of Y through the secure communication network or delivery mechanism (step S830).

Upon receiving the data S from the access right management server 105, the terminal 103*b* stores the data S into the memory unit 131 (step S840), In this way, it becomes possible for Y to utilize the data S at the terminal 103*b*.

Thus, according to the access right management system 130 of this embodiment, the access right management server 105 for encrypting the data by using the secret sharing scheme A and the terminals 103*a* and 103*b* are provided, where the access right management server 105 generates the divided data from the data S of X of the terminal 103*a* at the access right transferring side by using the random number R of X and the secret sharing scheme A, and manages a part of the divided data at the terminal 103*a*, and the rest of the divided data at the access right management server 105. Then, in the case where the access right for the data S is transferred from X to Y at the terminal 103*b*, the access right management server 105 generates the re-divided data from the divided data by using the random number R' of Y and the secret sharing scheme A, and manages a part of the re-divided data at the terminal 103*b* and the rest of the re-divided data at the access right management server 105, so that even in the case where the access right for the data to which accesses are limited by the encryption is to be transferred to another person, the access right can be transferred without decrypting the data once, and therefore it is possible to sufficiently secure the security.

In particular, the secret sharing scheme A according to this embodiment is a data division method for dividing the data into the divided data in a desired number of division according to a desired processing unit bit length, in which the divided data in a desired number of division are generated by generating a plurality of original partial data by partitioning the data in units of the processing unit bit length, generating a plurality of random number partial data of the processing unit bit length from a random number in a length shorter than or equal to the bit length of the data, in correspondence to respective ones of the plurality of the original partial data, and generating each divided partial data in the processing unit bit length that constitutes each divided data by calculating the exclusive OR of the original partial data and the random number partial data, while the data can be recovered from a prescribed sets of the divided data among the generated divided data, and also the re-divided data in a desired number of division are generated by generating a plurality of random number partial data of the processing unit bit length from a newly generated random number, and generating the re-divided partial data in the processing unit bit length by calculating the exclusive OR of the divided partial data and the random number partial data, while the data can be recovered from a prescribed sets of the re-divided data among the generated re-divided data, so that it is possible to re-divide the data without recovering the data. As a result, it becomes possible to manage the data of the user more securely.

Note that, the secret sharing scheme A of this embodiment does not require the multiple length integer calculation processing including the polynomial calculation, the residue calculation, etc., so that it is possible to carry out the division and the recovery of the data easily and quickly even in the case of processing many large capacity data.

It is also to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A secret information management system for managing a secret information of a user, comprising:
    a data division unit configured to divide the secret information into a plurality of divided data by using a secret sharing scheme, such that the secret information cannot be recovered from any one of the divided data alone but the secret information can be recovered from a prescribed number of the divided data;
    a divided data storing unit configured to store a part of the plurality of divided data into a terminal of the user as user's divided data, and a rest of the plurality of divided data into one or more of deposit servers;
    a data re-division unit configured to generate a plurality of re-divided data different from the plurality of divided data obtained by the data division unit, from a combination of the prescribed number of the divided data among the divided data stored in the deposit servers by using the secret sharing scheme; and
    a re-divided data storing unit configured to store a part of the plurality of re-divided data into the terminal as newly generated user's divided data and a rest of the plurality of re-divided data into the deposit servers as newly generated divided data;
        wherein the data division unit and the data re-division unit use the secret sharing scheme which is a data division method for dividing the secret information into the divided data in a desired number of divisions according to a desired processing unit bit length in which the divided data in the desired number of divisions are generated by generating a plurality of original partial data by partitioning the secret information in units of the processing unit bit length, generating a plurality of random number partial data of the processing unit bit length from a random number in a length shorter than or equal to a bit length of the secret information, in correspondence to respective ones of the plurality of original partial data, and generating each divided partial data in the processing unit bit length that constitutes each divided data by calculating exclusive OR of the original partial data and the random number partial data, and the re-divided data in the desired number of division are generated by generating a plurality of new random number partial data of the processing unit bit length from a newly generated random number, and generating the re-divided partial data in the processing unit bit length by calculating exclusive OR of the divided partial data and the new random number partial data.

2. The secret information management system of claim 1, further comprising:
    a data recovery unit configured to acquire the user's divided data, and recover the secret information from a combination of the prescribed number of the divided data among the user's divided data and the divided data stored in the deposit servers by using the secret sharing scheme, at a time of utilizing the secret information.

3. The secret information management system of claim 2, further comprising:
    a utilization log memory unit configured to store a fact that the secret information is utilized as a utilization log information, at a time of utilizing the secret information.

4. The secret information management system of claim 1, further comprising:
    a divided data transmission unit configured to transmit a combination of as many of the divided data stored in the deposit servers as the prescribed number minus a number of the divided data maintained by the user, to the terminal, at a time of recovering the secret information.

5. The secret information management system of claim 1, further comprising:
    a transmission unit configured to transmit the part of the divided data to be stored into the terminal, to the terminal through a communication network.

6. The secret information management system of claim 1, further comprising:
    a reception unit configured to receive the secret information from the terminal through a communication network.

7. The secret information management system of claim 1, wherein the data re-division unit generates the divided data by calculating exclusive OR of the divided partial data that constitute each divided data contained in a combination of the prescribed number of the divided data.

8. The secret information management system of claim 1, wherein the data division unit and the data re-division unit use the secret sharing scheme which generates each re-divided partial data that constitutes each re-divided data by calculating exclusive OR of each divided partial data and the new random number partial data corresponding to the random number partial data used in generating each divided partial data.

9. The secret information management system of claim 8, wherein the data division unit and the data re-division unit use the secret sharing scheme in which old random number partial data are deleted from each re-divided partial data that constitutes each re-divided data by calculating exclusive OR of each re-divided partial data and the old random number partial data used in generating each divided partial data corresponding to each re-divided partial data.

10. The secret information management system of claim 1, wherein the data division unit and the data re-division unit use the secret sharing scheme in which the desired number of division is n=3, the divided partial data $D(i,j)$ ($i$=1 to 3, $j$=1 to 2) that constitute each divided data are modified by interchanging $D(1,j+1)$ and $D(2, j+1)$.

11. The secret information management system of claim 1, wherein the data division unit and the data re-division unit use the secret sharing scheme in which the desired number of division is n=4, the divided partial data $D(i,j)$ ($i$=1 to n, $j$=1 to n−1) that constitute each divided data are modified by setting a new value of $D(1,j)$ to be exclusive OR of $D(1,j)$ and $D(n,j)$, and then rotating $D(1,j), D(2,j), \ldots D((n-1),j)$.

12. The secret information management system of claim 11, wherein the data division unit and the data re-division unit use the secret sharing scheme in which D(1,j), D(2,j), . . . D((n−1),j) are rotated for (i−1) times.

13. The secret information management system of claim 1, wherein the data re-division unit generates the plurality of re-divided data from a combination of the prescribed number of the divided data among the divided data stored in the deposit servers and the user's divided data stored in the terminal, upon receiving the user's divided data from the terminal, and the re-divided data storing unit stores a part of the plurality of re-divided data into another terminal of another user as another user's divided data and a rest of the plurality of re-divided data into the deposit servers as new divided data, at a time of transferring an access right for the secret information from the user to the another user.

14. A secret information management method for managing a secret information of a user, comprising the steps of:

dividing the secret information into a plurality of divided data by using a secret sharing scheme, such that that the secret information cannot be recovered from any one of the divided data alone but the secret information can be recovered from a prescribed number of the divided data;

storing a part of the plurality of divided data into a terminal of the user as user's divided data, and a rest of the plurality of divided data into one or more of deposit servers;

generating a plurality of re-divided data different from the plurality of divided data obtained by the dividing step, from a combination of the prescribed number of the divided data among the divided data stored in the deposit servers by using the secret sharing scheme; and storing a part of the plurality of re-divided data into the terminal as newly generated user's divided data and a rest of the plurality of re-divided data into the deposit servers as newly generated divided data;

wherein the dividing step and the generating step use the secret sharing scheme which is a data division method for dividing the secret information into the divided data in a desired number of divisions according to a desired processing unit bit length, in which the divided data in the desired number of divisions are generated by generating a plurality of original partial data by partitioning the secret information in units of the processing unit bit length, generating a plurality of random number partial data of the processing unit bit length from a random number in a length shorter than or equal to a bit length of the secret information in correspondence to respective ones of the plurality of original partial data, and generating each divided partial data in the processing unit bit length that constitutes each divided data by calculating exclusive OR of the original partial data and the random number partial data, and the re-divided data in the desired number of divisions are generated by generating a plurality of new random number partial data of the processing unit bit length from a newly generated random number and generating the re-divided partial data in the processing unit bit length by calculating exclusive OR of the divided partial data and the new random number partial data.

15. A non-transitory computer readable medium including a computer program implementable on a computer to cause the computer to function as a secret information management system for managing a secret information of a user, the computer program comprising:

a first computer program code for causing the computer to divide the secret information into a plurality of divided data by using a secret sharing scheme, such that the secret information cannot be recovered from any one of the divided data alone but the secret information can be recovered from a prescribed number of the divided data;

a second computer program code for causing the computer to store a part of the plurality of divided data into a terminal of the user as user's divided data, and a rest of the plurality of divided data into one or more of deposit servers;

a third computer program code for causing the computer to generate a plurality of re-divided data different from the plurality of divided data obtained by the first computer program code, from a combination of the prescribed number of the divided data among the divided data stored in the deposit servers by using the secret sharing scheme; and a fourth computer program code for causing the computer to store a part of the plurality of re-divided data into the terminal as newly generated user's divided data and a rest of the plurality of re-divided data into the deposit servers as newly generated divided data;

wherein the first computer program code and the third computer program code use the secret sharing scheme which is a data division method for dividing the secret information into the divided data in a desired number of divisions according to a desired processing unit bit length in which the divided data in the desired number of divisions are generated by generating a plurality of original partial data by partitioning the secret information in units of the processing unit bit length, generating a plurality of random number partial data of the processing unit bit length from a random number in a length shorter than or equal to a bit length of the secret information in correspondence to respective ones of the plurality of original partial data, and generating each divided partial data in the processing unit bit length that constitutes each divided data by calculating exclusive OR of the original partial data and the random number partial data and the re-divided data in the desired number of division are generated by generating a plurality of new random number partial data of the processing unit bit length from a newly generated random number and generating the re-divided partial data in the processing unit bit length by calculating exclusive OR of the divided partial data and the new random number partial data.

\* \* \* \* \*